US010423059B2

(12) United States Patent
Nashida et al.

(10) Patent No.: US 10,423,059 B2
(45) Date of Patent: Sep. 24, 2019

(54) IMAGE DISPLAY APPARATUS

(71) Applicant: Sony Corporation, Tokyo (JP)

(72) Inventors: Tatsushi Nashida, Kanagawa (JP);
Naomasa Takahashi, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 16/060,110

(22) PCT Filed: Nov. 11, 2016

(86) PCT No.: PCT/JP2016/083468
§ 371 (c)(1),
(2) Date: Jun. 7, 2018

(87) PCT Pub. No.: WO2017/104320
PCT Pub. Date: Jun. 22, 2017

(65) Prior Publication Data
US 2018/0356718 A1 Dec. 13, 2018

(30) Foreign Application Priority Data

Dec. 16, 2015 (JP) .................................. 2015-245710

(51) Int. Cl.
G03B 21/56 (2006.01)
G02B 27/22 (2018.01)
(Continued)

(52) U.S. Cl.
CPC ........... G03B 21/562 (2013.01); G02B 27/22 (2013.01); G03B 21/10 (2013.01); G03B 21/56 (2013.01);
(Continued)

(58) Field of Classification Search
CPC ....... G03B 21/58; G03B 21/62; G03B 21/562
See application file for complete search history.

(56) References Cited

U.S. PATENT DOCUMENTS 5,486,141 A 1/1996 Ohga et al.
6,176,584 B1 * 1/2001 Best ........................ G09F 19/18
353/30
(Continued)

FOREIGN PATENT DOCUMENTS

EP 2027507 A1 2/2009
EP 2260753 A1 12/2010
(Continued)

OTHER PUBLICATIONS

Partial Supplementary European Search Report for Application No. 16875304.4 dated Sep. 3, 2018.
(Continued)

Primary Examiner — Sultan Chowdhury
(74) Attorney, Agent, or Firm — Lerner, David, Littenberg, Krumholz & Mentlik, LLP

(57) ABSTRACT

To provide a projection-type image display apparatus which projects an image on a dome screen and a dome type screen apparatus for image projection.
An image display apparatus 100 includes a dome screen 101, a support body 102 configured to support the dome screen 101 so that the dome screen 101 is rotatable around a horizontal axis, two projectors 103 and 104 and a display control apparatus 105, and a chair 106 on which a viewer sits is provided inside space. By rotating the dome screen 101, it is possible to expand a viewing field in a vertical direction.

18 Claims, 34 Drawing Sheets

(51) Int. Cl.

| | | |
|---|---|---|
| *G03B 21/10* | (2006.01) | |
| *G09G 5/00* | (2006.01) | |
| *G09G 5/36* | (2006.01) | |
| *G09G 5/377* | (2006.01) | |
| *G09B 9/05* | (2006.01) | |
| *G09B 9/30* | (2006.01) | |
| *G09G 3/00* | (2006.01) | |
| *H04N 9/31* | (2006.01) | |
| *G03B 37/04* | (2006.01) | |
| *G09B 27/00* | (2006.01) | |
| *G09B 5/06* | (2006.01) | |
| *G03B 21/60* | (2014.01) | |

(52) U.S. Cl.
CPC ............ *G03B 21/60* (2013.01); *G03B 37/04* (2013.01); *G09B 5/065* (2013.01); *G09B 9/05* (2013.01); *G09B 9/30* (2013.01); *G09B 27/00* (2013.01); *G09G 3/001* (2013.01); *G09G 5/00* (2013.01); *G09G 5/36* (2013.01); *G09G 5/377* (2013.01); *H04N 9/3147* (2013.01); *G09G 2320/028* (2013.01); *G09G 2354/00* (2013.01)

(56) References Cited

U.S. PATENT DOCUMENTS

| | | | |
|---|---|---|---|
| 2006/0055887 A1* | 3/2006 | Hoshino | G02B 27/2221 353/7 |
| 2006/0152680 A1 | 7/2006 | Shibano | |
| 2007/0058229 A1* | 3/2007 | Hudyma | G02B 27/0025 359/196.1 |
| 2008/0002161 A1 | 1/2008 | Streid et al. | |
| 2009/0039692 A1* | 2/2009 | Tuckey | A47D 1/004 297/344.22 |
| 2010/0208213 A1 | 8/2010 | Yoshii | |
| 2011/0214359 A1* | 9/2011 | Magpuri | E04H 3/22 52/9 |
| 2012/0287407 A1* | 11/2012 | De Paor | G03B 21/56 353/30 |
| 2014/0016101 A1* | 1/2014 | Kim | G03B 21/14 353/30 |
| 2015/0109648 A1 | 4/2015 | Uchiyama | |
| 2015/0126877 A1 | 5/2015 | Roehr et al. | |
| 2016/0333597 A1 | 11/2016 | De Lespinois et al. | |

FOREIGN PATENT DOCUMENTS

| | | |
|---|---|---|
| JP | H6161348 A | 6/1994 |
| JP | H0780096 | 3/1995 |
| JP | H8131659 A | 5/1996 |
| JP | 2000310826 A | 11/2000 |
| JP | 2001042260 A | 2/2001 |
| JP | 2002360930 A | 12/2002 |
| JP | 2003345324 A | 12/2003 |
| JP | 2005277670 A | 10/2005 |
| JP | 2006516333 A | 6/2006 |
| JP | 2006220772 A | 8/2006 |
| JP | 200817346 A | 1/2008 |
| JP | 2010015128 A | 1/2010 |
| JP | 2012058679 A | 3/2012 |
| JP | 2012239849 A | 12/2012 |
| JP | 2013250451 A | 12/2013 |
| JP | 2015081965 A | 4/2015 |
| WO | 2007141933 A1 | 12/2007 |

OTHER PUBLICATIONS

International Search Report corresponding to PCT/JP2016/083468, dated Feb. 14, 2017 (3 pgs.)
Extended European Search Report and Written Opinion for EP Application No. 16875304.4, dated Dec. 6, 2018.

* cited by examiner

IMAGE DISPLAY APPARATUS

CROSS-REFERENCE TO RELATED APPLICATIONS

This application is a national phase entry under 35 U.S.C. § 371 of International Application No. PCT/JP2016/083468 filed Nov. 11, 2016, which claims the priority from Japanese Patent Application No. 2015-245710 filed in the Japanese Patent Office on Dec. 16, 2015, the entire contents of which are hereby incorporated by reference.

TECHNICAL FIELD

The technique disclosed in the present specification relates to an image display apparatus which projects an image on a dome screen.

BACKGROUND ART

A projection-type image display apparatus which projects various images such as a video received on television, a video reproduced from a medium such as a Blu-ray and a screen of a personal computer (PC) on a screen is widely known. Recently, a projector which uses a laser or a light emitting diode (LED) as a light source and which has high color saturation and favorable color reproducibility has become widely used.

For example, it is possible to project a video with realistic sensation which has a wide viewing angle in a horizontal direction and in a vertical direction by using a dome screen having a spherical surface or a semispherical shape (see, for example, Patent Literatures 1 to 3). Further, examples of a video with a wide viewing angle, which is to be projected on the dome screen can include commercial content such as a movie, a video of a game, a video supplied from a camera (for example, a full-dome camera) mounted on a mobile body in a remote location or a robot, or the like.

CITATION LIST

Patent Literature

Patent Literature 1: JP 2012-58679A
Patent Literature 2: JP 2013-250451A
Patent Literature 3: JP 2015-81965A

DISCLOSURE OF INVENTION

Technical Problem

An object of the technique disclosed in the present specification is to provide a projection-type image display apparatus which projects an image on a dome screen.

Solution to Problem

The technology disclosed in the present specification has been devised in view of the above-described problem, and a first aspect thereof is an image display apparatus including: a movable dome screen; a support body configured to support the dome screen; and a plurality of projectors whose relative positions with the dome screen and attitude are each fixed.

According to a second aspect of the technology disclosed in the present specification, the support body of the image display apparatus according to the first aspect supports the dome screen so that the dome screen is rotatable around a predetermined horizontal axis. The plurality of projectors are configured to move in accordance with rotation of the dome screen around a horizontal axis.

According to a third aspect of the technology disclosed in the present specification, the image display apparatus according to the first aspect further includes: a display control apparatus configured to control a video to be projected on the dome screen from the plurality of projectors.

According to a fourth aspect of the technology disclosed in the present specification, the display control apparatus of the image display apparatus according to the third aspect is configured to perform stitching processing on images to be projected on the dome screen by the plurality of projectors.

According to a fifth aspect of the technology disclosed in the present specification, the display control apparatus of the image display apparatus according to the third aspect is configured to perform distortion correction processing on images to be projected on the dome screen by the plurality of projectors.

According to a sixth aspect of the technology disclosed in the present specification, the support body of the image display apparatus according to the first aspect is configured to support the dome screen with a pair of shaft portions so that the dome screen is rotatable around a predetermined horizontal axis by 90 degrees.

According to a seventh aspect of the technology disclosed in the present specification, the display control apparatus of the image display apparatus according to the third aspect is configured to switch a viewing field of a video to be projected from the plurality of projectors in accordance with rotation of the dome screen around a horizontal axis.

According to an eighth aspect of the technology disclosed in the present specification, the image display apparatus according to the first aspect further includes: an input unit configured to give an instruction to move a viewing field. The display control unit is then configured to switch a viewing field of a video to be projected from the plurality of projectors in accordance with the instruction to move the viewing field via the input unit.

According to a ninth aspect of the technology disclosed in the present specification, the image display apparatus according to the first aspect further includes: a sound output apparatus.

According to a tenth aspect of the technology disclosed in the present specification, the image display apparatus according to the first aspect further includes: a camera configured to image an inside of the dome screen.

According to an eleventh aspect of the technology disclosed in the present specification, the image display apparatus according to the first aspect further includes: a multimodal feedback device.

According to a twelfth aspect of the technology disclosed in the present specification, the multimodal feedback device of the image display apparatus according to the eleventh aspect is configured to adjust a temperature or humidity inside the dome screen, let wind blow or spray water inside the dome screen, cause a sense of touch or vibration or provide odor or aroma.

According to a thirteenth aspect of the technology disclosed in the present specification, the dome screen of the image display apparatus according to the first aspect has a display surface whose inner diameter is from 1.5 to 2 meters as an inner periphery.

According to a fourteenth aspect of the technology disclosed in the present specification, the image display apparatus according to the first aspect is used in combination with a chair stored within the dome screen.

According to a fifteenth aspect of the technology disclosed in the present specification, the image display apparatus according to the first aspect is used in combination with a health appliance stored within the dome screen.

According to a sixteenth aspect of the technology disclosed in the present specification, the image display apparatus according to the fourteenth aspect further includes: a video switching instructing unit through which a viewer gives an instruction to switch a viewing field to be projected on the dome screen while the viewer is sitting on the chair.

According to a seventeenth aspect of the technology disclosed in the present specification, the video switching instructing unit of the image display apparatus according to the sixteenth aspect is configured to detect a direction of a head and slight up and down motion of a body of the viewer who is sitting on the chair and convert the direction of the head and the slight up and down motion into action of a viewing field moving instruction.

According to an eighteenth aspect of the technology disclosed in the present specification, a display control unit of the image display apparatus according to the sixteenth aspect is configured to superimpose and display a target mark on a video projected on the dome screen, the target mark indicating a candidate for a next position of a viewpoint.

According to a nineteenth aspect of the technology disclosed in the present specification, in the image display apparatus according to the fourteenth aspect, a seating surface of the chair is supported with a spring which is expandable and contractible in a vertical direction.

Advantageous Effects of Invention

According to the technique disclosed in the present specification, it is possible to provide a projection-type image display apparatus which projects an image on a dome screen.

Note that the advantageous effects described in this specification are merely for the sake of example, and the advantageous effects of the present invention are not limited thereto. Furthermore, in some cases the present invention may also exhibit additional advantageous effects other than the advantageous effects given above.

Further objectives, features, and advantages of the technology disclosed in this specification will be clarified by a more detailed description based on the exemplary embodiments discussed hereinafter and the attached drawings.

MODE(S) FOR CARRYING OUT THE INVENTION

An embodiment of the technique disclosed in the present specification will be described in detail below with reference to the drawings.

Figure 1:
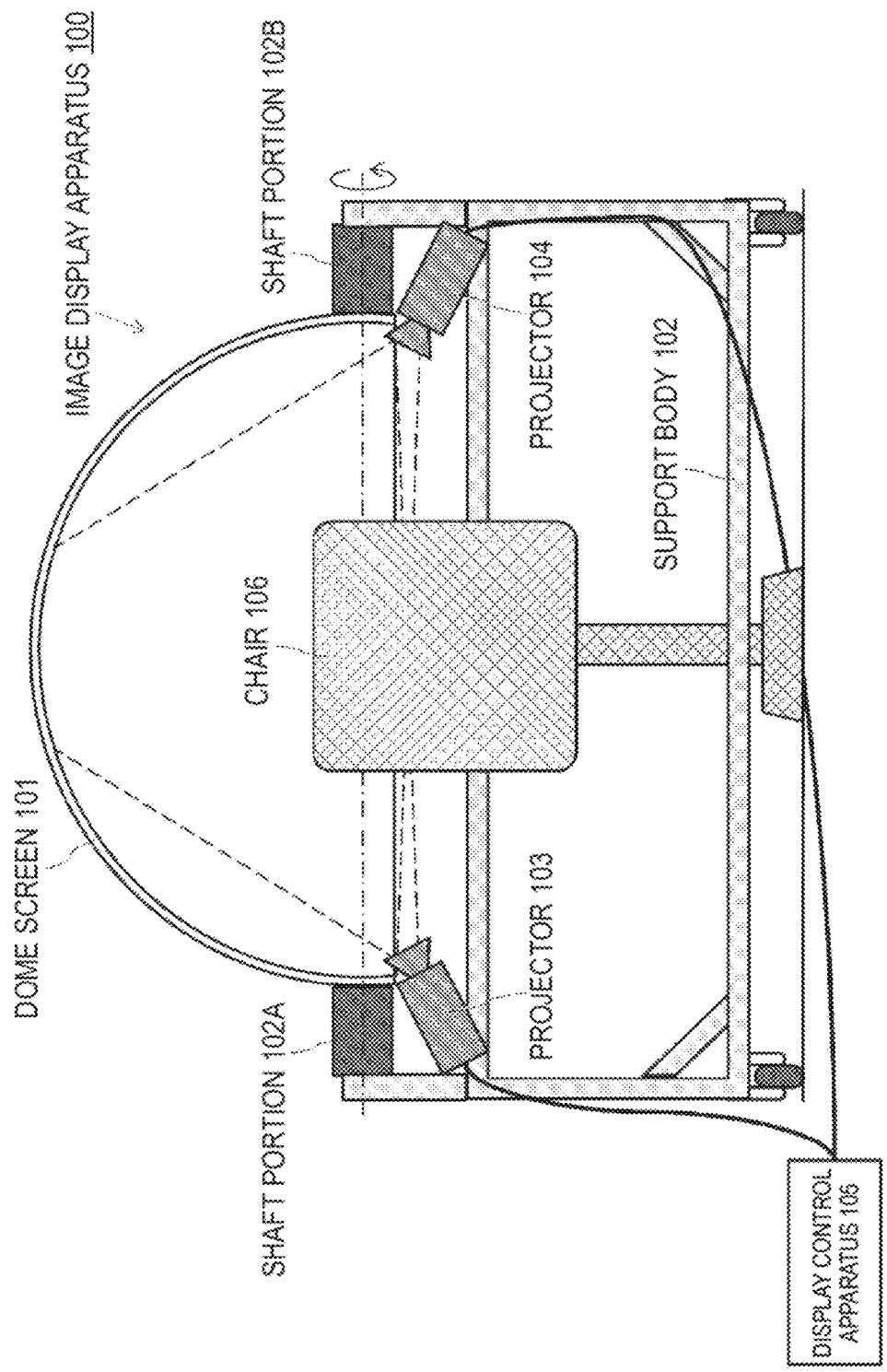
FIG. 1 is a diagram schematically illustrating a configuration example of an image display apparatus 100 according to an embodiment of the technique disclosed in the present specification.
Figure 2:
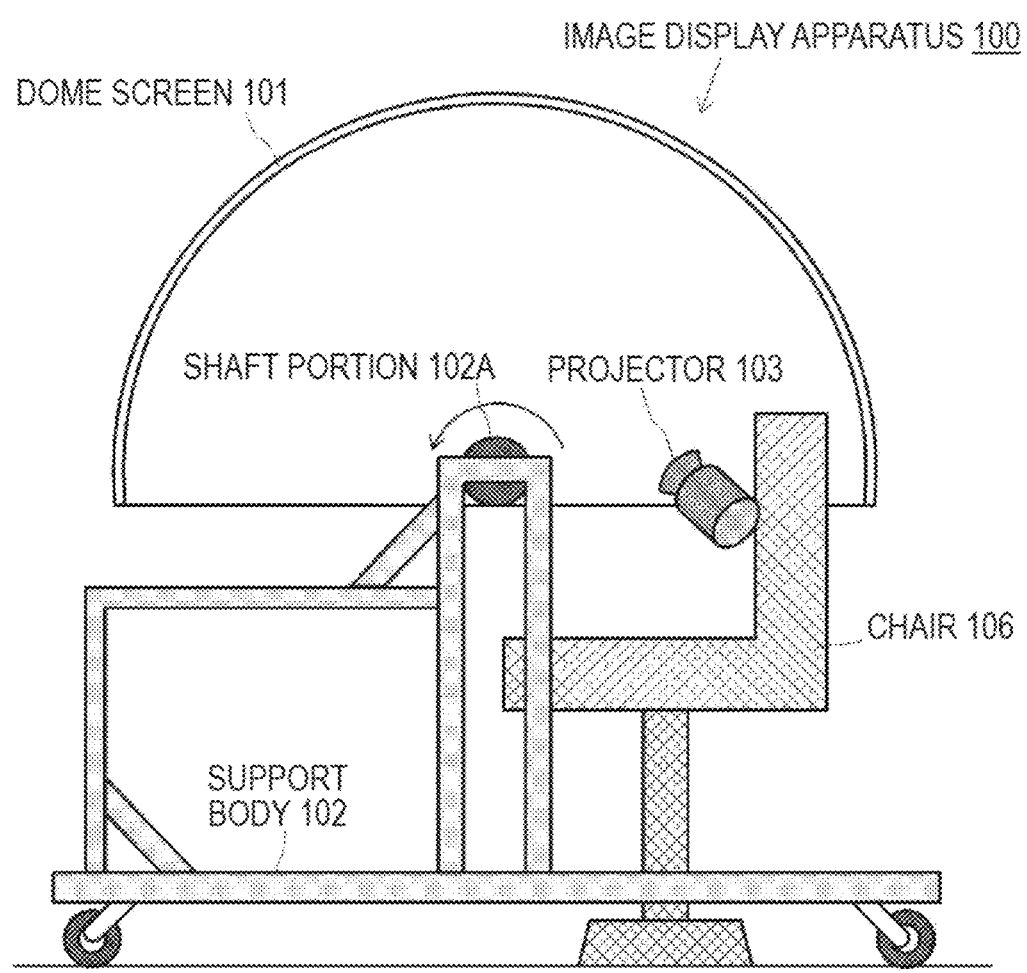
FIG. 2 is a diagram schematically illustrating a configuration example of an image display apparatus 100 according to an embodiment of the technique disclosed in the present specification.

FIG. 1 and FIG. 2 schematically illustrate a configuration example of an image display apparatus 100 according to an embodiment of the technique disclosed in the present specification. The image display apparatus 100 is a projection-type display apparatus which projects an image on a dome screen, and with which a viewer can observe a projected video if the viewer enters a dome. FIG. 1 illustrates a cross-section of the dome screen 101 cut on a front plane, and FIG. 2 illustrates a cross-section of the dome screen 101 cut on a sagittal plane.

The illustrated image display apparatus 100 includes a dome screen 101, a support body 102 which supports the dome screen 101, two projectors 103 and 104, and a display control apparatus 105. Further, inside of space formed by the dome screen 101, a chair 106 on which a viewer who observes a projected video sits is provided.

The dome screen 101 has an inner periphery which is a display surface of a projected image. The dome screen 101 is manufactured with, for example, a resin such as light fiber reinforced plastics (FRP), a metal, glass, or the like. It is preferable that painting or coating for preventing diffused reflection of light (projected video) or other surface treatment is applied on an inner periphery surface of the dome screen 101.

The inner periphery of the dome screen 101 has a spherical or semispherical shape. By using the dome screen 101 having a spherical or semispherical shape, it is possible to project a video which has realistic sensation and which has a wide viewing angle in a horizontal direction and in a vertical direction (described above). Note that an outer shape of the dome screen 101 is not particularly limited.

Figure 21:
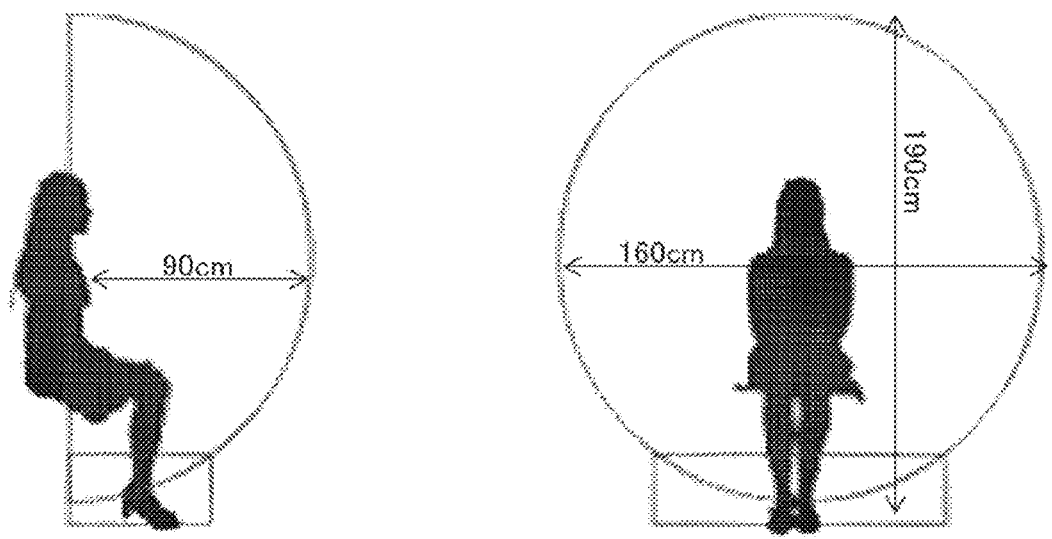
FIG. 21 is a diagram illustrating a scale of the dome screen 101.

A viewer is more likely to feel the scale of a subject from the video projected on the dome screen 101 compared to a case where the viewer observes an enlarged visual image with a head mount display (hereinafter, referred to as an "HMD"). For example, by setting an inner diameter of the dome screen 101 at approximately from 1.5 to 2 meters, it is possible to display a video of a subject (such as a person) from which the viewer can feel the subject at a life size, so that it is possible to increase reality. FIG. 21 illustrates a scale of the dome screen 101. In the illustrated example, a distance from a viewer sitting on the chair 106 to the dome screen 101 is 90 centimeters, a diameter (or a width) of the dome screen 101 is 160 centimeters, and a height of the image display apparatus 100 is 190 centimeters at a maximum. For example, in the case where a video obtained by imaging a person who looks into a camera is projected, the viewer can experience a strong sense of reality as if the viewer caught the eye of the person in the video (made eye contact).

Further, while the image display apparatus 100 of a type which projects a video on the dome screen 101 provides a sense of release compared to the HMD, as illustrated in FIG. 1 and FIG. 2, a sense of immersion increases by a whole peripheral image of 360 degrees in the horizontal direction being presented.

The support body 102 includes a pair of shaft portions 102A and 102B having an identical rotation axis, and supports the dome screen 101 with the pair of shaft portions 102A and 102B so that the dome screen 101 is rotatable around the horizontal axis within a sagittal plane. However, the structure is not limited to the structure in which the dome screen 101 is supported with the pair of shaft portions 102A and 102B if the dome screen 101 can be supported so as to be rotatable around the horizontal axis within the sagittal plane.

Further, the support body 102 may also include a mechanism for supporting the dome screen 101 so that the dome screen 101 is rotatable around a vertical axis. Still further, the support body 102 may have a structure which supports the dome screen 101 while allowing a degree of freedom other than rotation, such as up-and-down motion.

The two projectors 103 and 104 project video signals (video signals having a wide viewing angle) each supplied from the display control apparatus 105 on the inner periphery of the dome screen 101. It is assumed that each of the projectors 103 and 104 can project an image which has high color saturation and favorable color reproducibility on the dome screen 101 using a laser or an LED as a light source.

In the present embodiment, a relative position and attitude of each of the projectors 103 and 104 with respect to the dome screen 101 are fixed around a periphery of the dome screen 101 so that the whole display surface of the inner periphery of the dome screen 101 can be covered with projected images from the respective projectors 103 and 104. It is assumed that each of the projectors 103 and 104 is fixed at the dome screen 101 via, for example, a table (not illustrated) having six degrees of freedom in three axis directions and around respective axes, and can finely adjust each optical axis (projection direction). If the dome screen 101 is rotated around the horizontal axis (which will be described later), each of the projectors 103 and 104 also move in an integrated manner.

The display control apparatus 105 supplies a video signal to each of the projectors 103 and 104. As a video with a wide viewing angle to be projected on the dome screen 101, commercial content such as a movie, a video of a game, a video supplied from a camera (for example, a full-dome camera) mounted on a mobile body (including a person, an animal, a vehicle and a robot) in a remote location, or the like, can be utilized. The display control apparatus 105 is externally connected to a media reproducing apparatus (such as BD player) or game machine which becomes a video source or receives a video stream distributed from a remote location via a transmission path of communication, broadcasting, or the like. It is assumed that the image display apparatus 100 according to the present embodiment includes an interface for connecting external equipment, a communication interface for connecting to a network, a receiver which receives a broadcast signal, or the like.

Within the display control apparatus 105, various kinds of image processing are executed on a video signal to be supplied to each of the projectors 103 and 104, the processing including rendering processing and image quality adjustment of a video with a wide viewing angle to be projected on the dome screen 101.

Figure 16:
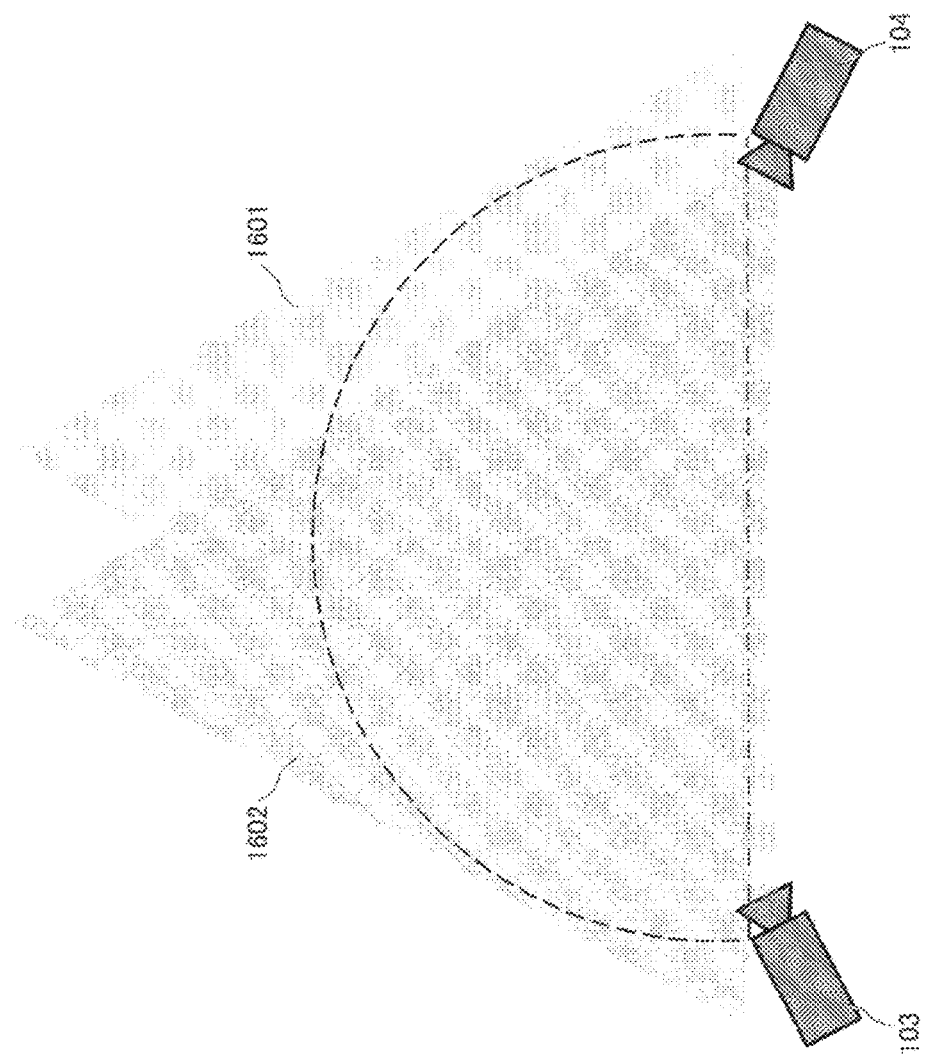
FIG. 16 is a diagram illustrating an aspect where projected videos 1601, 1602 respectively from projectors 103 and 104 are stitched.

For example, by the display control apparatus 105 performing stitching processing on a joint portion between images projected on the dome screen 101 from the respective projectors 103 and 104, it is possible to present a video with a wide viewing angle on the dome screen 101. Arbitrary algorithm can be applied to the stitching processing. FIG. 16 illustrates an aspect where projected videos 1601, 1602 from the respective projectors 103 and 104 are stitched. It is assumed that the projected videos 1601, 1602 from the respective projectors 103 and 104 each have resolution of 4 K (approximately 4000 horizontal×2000 vertical).

Further, it is also possible to correct optical distortion of each of the projectors 103 and 104 and distortion of a video with a wide viewing angle due to deformation (including change over time) of the inner periphery of the dome screen 101 through image processing within the display control apparatus 105. For example, it is only necessary to project a test pattern in a known shape on the dome screen 101 from each of the projectors 103 and 104 and perform image processing of cancelling distortion of a projected image of the test pattern.

Further, it is also possible to correct distortion of a projected image due to a positioning error when each of the projectors 103 and 104 is fixed at the dome screen 101 through image processing within the display control apparatus 105.

Note that the display control apparatus 105 may superimpose and display a graphical user interface (GUI) including a menu and a button and on screen display (OSD) on a video with a wide viewing angle to be projected form each of the projectors 103 and 104.

The illustrated image display apparatus 100 is, for example, provided indoors and utilized. Of course, the image display apparatus 100 may be provided outdoors and utilized. Further, a part for movement such as a caster may be attached to a lower end of the support body 102 so as to be able to move a location where the image display apparatus 100 is provided. Still further, while the image display apparatus 100 is used by one person in the example illustrated in FIG. 1 and FIG. 2, it is also assumed that the image display apparatus 100 is used by a plurality of persons or utilized in business to business (B2B).

Subsequently, meaning of supporting the dome screen 101 so that the dome screen 101 is rotatable in the image display apparatus 100 according to the present embodiment will be described.

As illustrated in FIG. 1 and FIG. 2, in the case where the dome screen 101 is substantially horizontally supported, it is possible to present a whole peripheral video of 360 degrees in a horizontal direction on the display surface of the dome screen 101.

Figure 3:
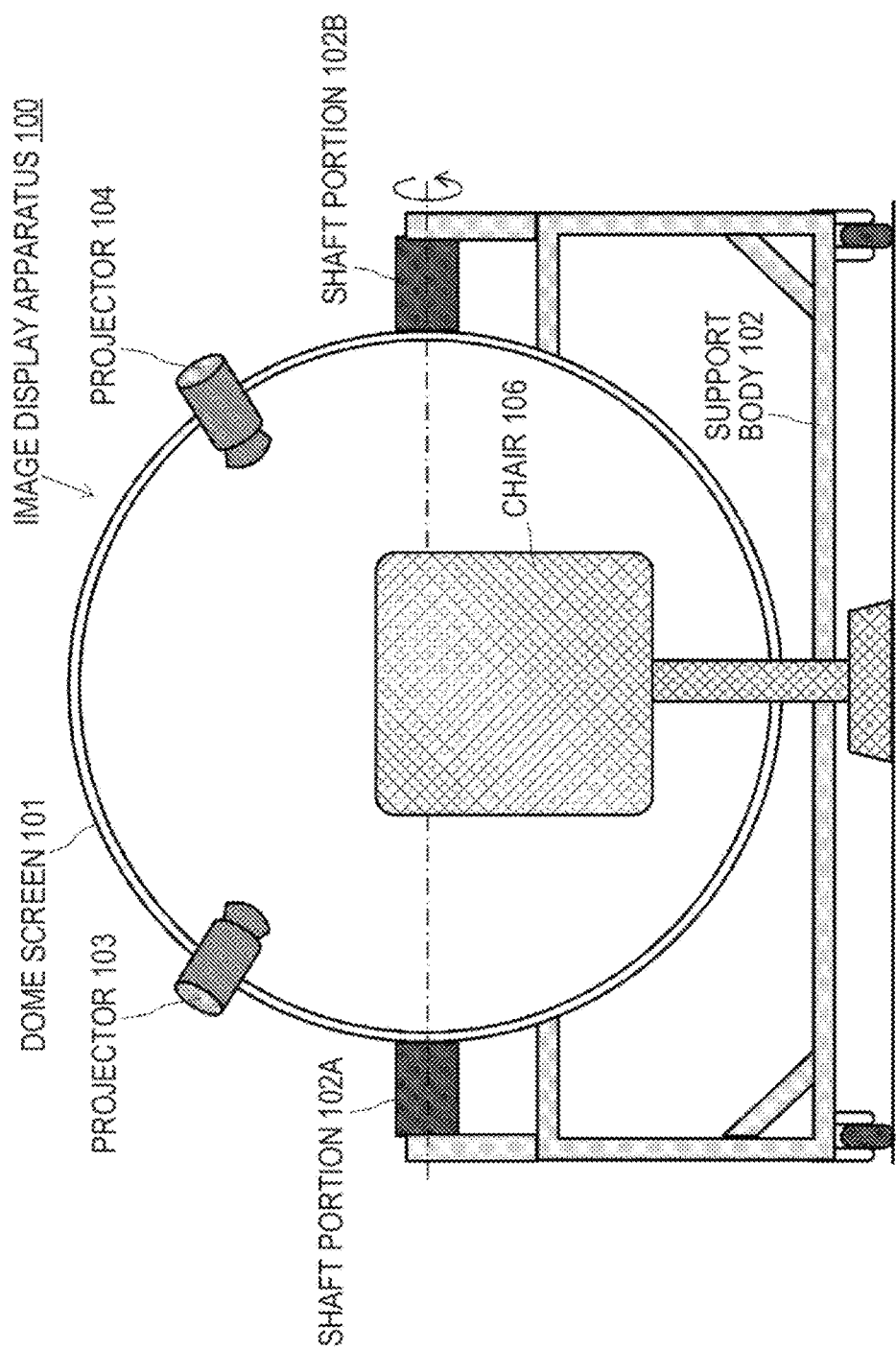
FIG. 3 is a diagram illustrating a form of use of the image display apparatus 100.
Figure 4:
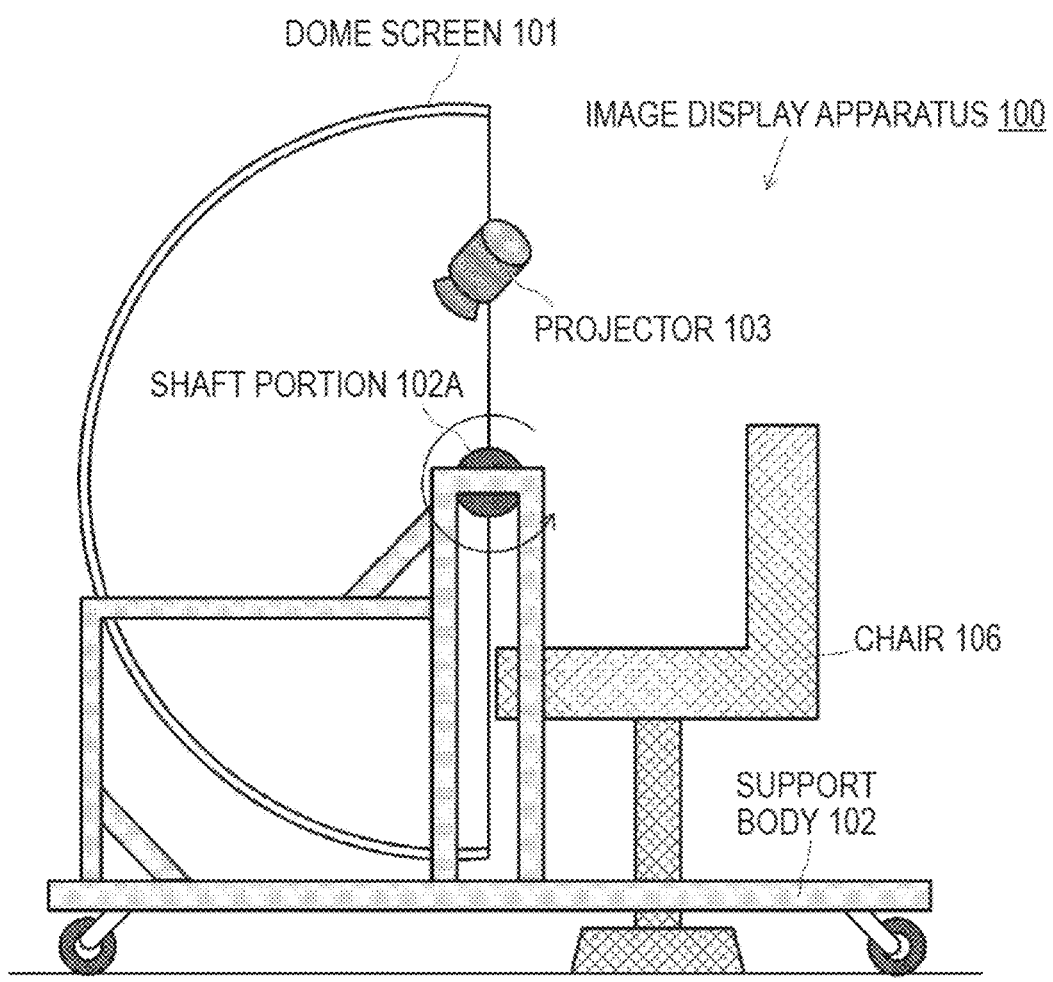
FIG. 4 is a diagram illustrating a form of use of the image display apparatus 100.

Meanwhile, as illustrated in FIG. 3 and FIG. 4, if the dome screen 101 is rotated around the rotation axis of the shaft portions 102A and 102B by 90 degrees around the horizontal axis within the sagittal plane, it is possible to present a whole peripheral video of 360 degrees in a vertical direction on the display surface of the dome screen 101. For example, in the case where a video with a wide viewing angle assuming the sky, an upper tier, or the like, is observed, as illustrated in FIG. 3 and FIG. 4, if the dome screen 101 is rotated by 90 degrees, it is possible to also present a video of a downward portion (for example, the ground).

Figure 5:
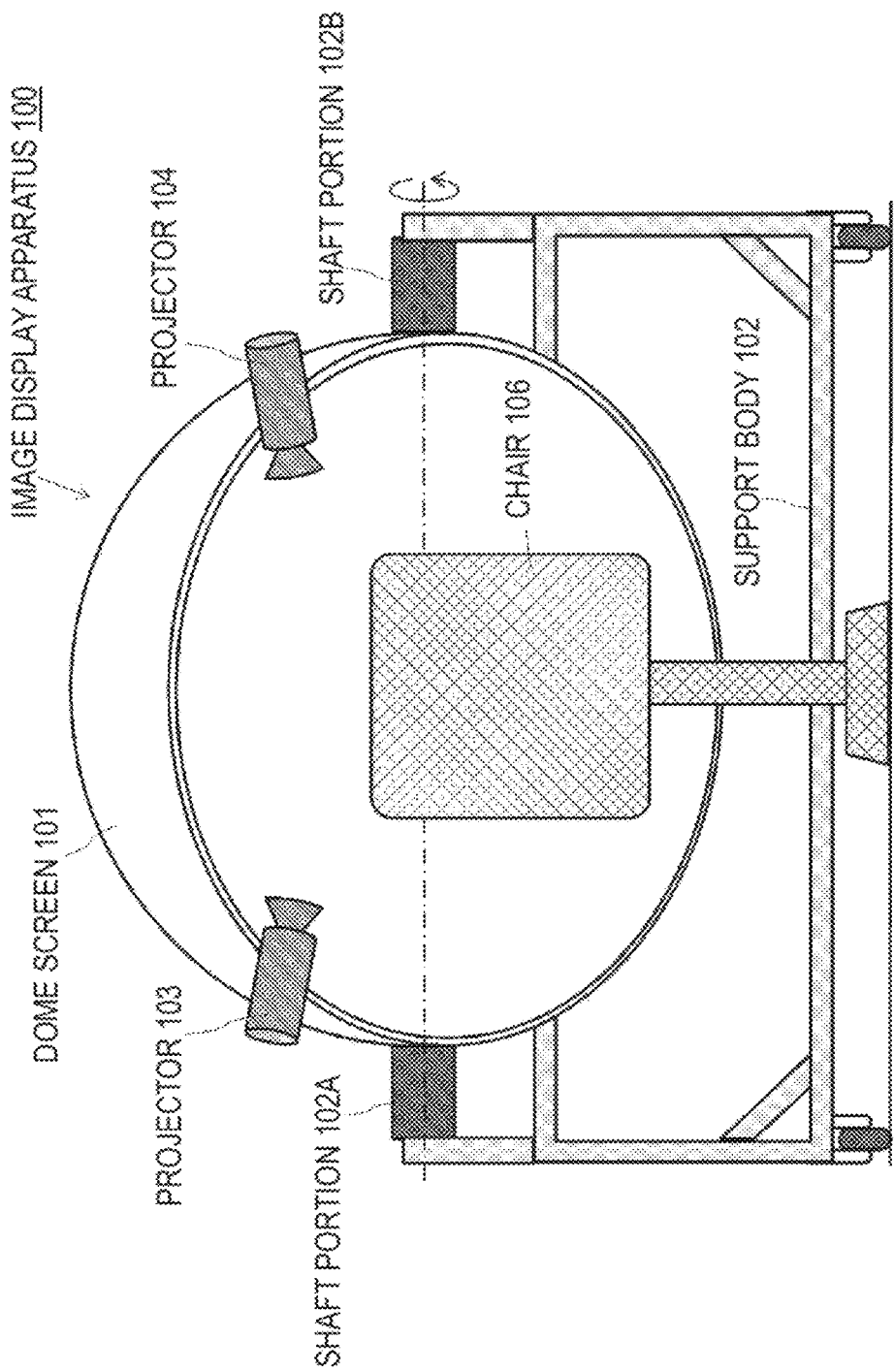
FIG. 5 is a diagram illustrating a form of use of the image display apparatus 100.
Figure 6:
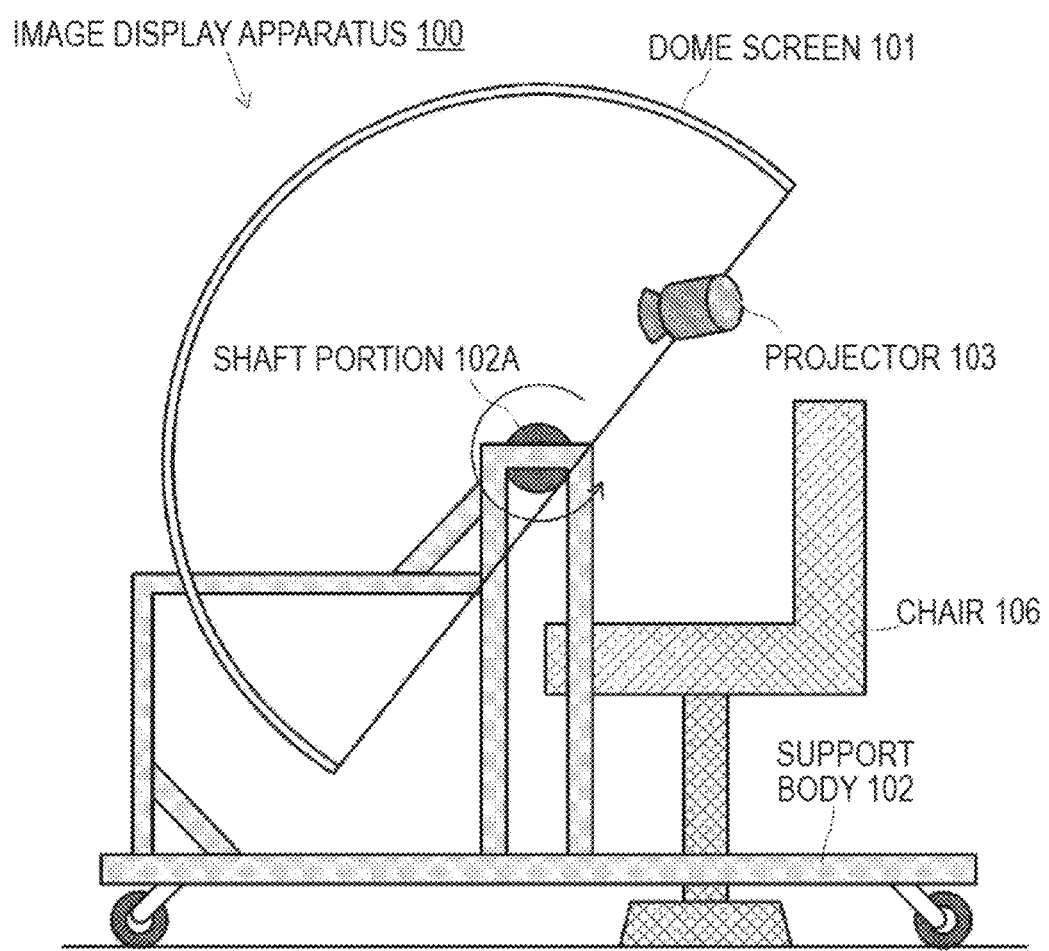
FIG. 6 is a diagram illustrating a form of use of the image display apparatus 100.

Further, it is also possible to use the image display apparatus 100 by tilting the dome screen 101 at an arbitrary angle from 0 to 90 degrees around the horizontal axis within the sagittal plane as illustrated in FIG. 5 and FIG. 6, as well as provide the dome screen 101 in a horizontal direction or in a vertical direction as illustrated in FIG. 1 to FIG. 4.

Note that the dome screen 101 may be manually rotated. Alternatively, the dome screen 101 may be electrically rotated by an electric motor being incorporated into at least one of the shaft portions 102A and 102B. Further, it is also possible to measure a rotation angle of the dome screen 101 to position the rotation angle with high accuracy by incorporating an encoder within an electric motor or providing other sensors.

Figure 7A:
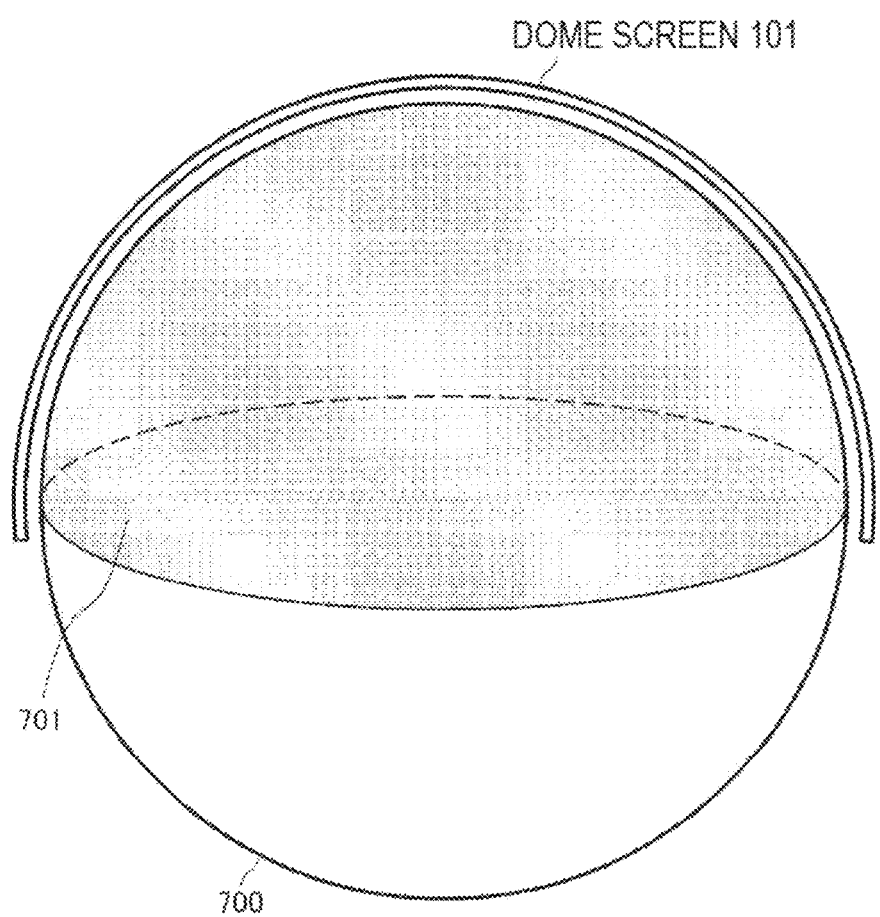
FIG. 7A is a diagram illustrating an aspect where a video to be projected is switched in conjunction with rotation of a dome screen 101.
Figure 7B:
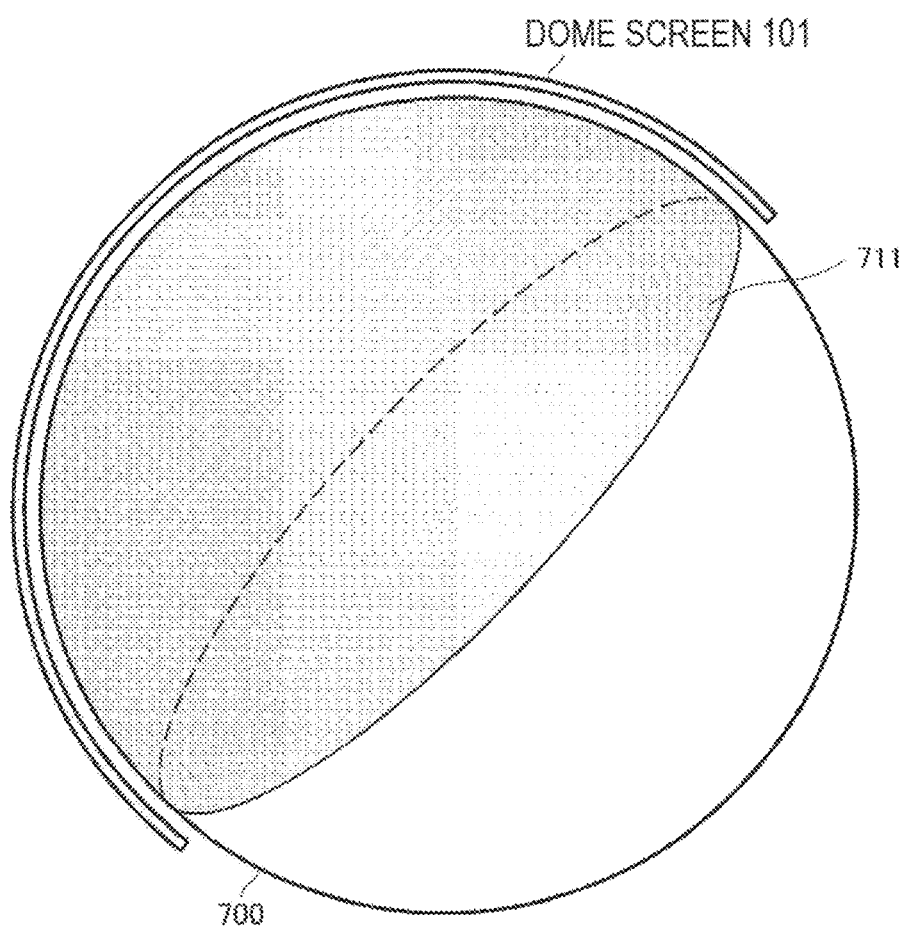
FIG. 7B is a diagram illustrating an aspect where a video to be projected is switched in conjunction with rotation of a dome screen 101.

The display control apparatus 105 switches a viewing field of a video to be projected from each of the projectors 103 and 104 in conjunction with change of the rotation angle of the dome screen 101. FIG. 7A and FIG. 7B illustrate an aspect where a video to be projected is switched in conjunction with rotation of the dome screen 101.

When the dome screen 101 is set at a horizontal position as illustrated in FIG. 1 and FIG. 2, a region indicated with a reference numeral 701 in FIG. 7A among the original video with a wide viewing angle 700 is projected from each of the projectors 103 and 104. Further, when the dome screen 101 is rotated around the horizontal axis as illustrated in FIG. 5 and FIG. 6, a region indicated with a reference numeral 711 in FIG. 7B among the original video with a wide viewing angle 700 is projected from each of the projectors 103 and 104. In short, the rotation position of the dome screen 101 corresponds to a viewing angle of the video which can be observed with the dome screen 101. For example, by rotating the dome screen 101 around the horizontal axis at an angle in accordance with application, such as 180 degrees, 210 degrees, 240 degrees, . . . , 330 degrees and 360 degrees, it is possible to provide a video with a viewing field in accordance with application to the viewer. Even if the dome screen 101 rotates around the rotation axis of the shaft portions 102A and 102B, while display of the same subject or scenery is maintained in the same gaze direction of the viewer who sits on the chair 106, the viewing field of the viewer shifts upward or downward in accordance with a rotation amount.

While a viewing field of 360 degrees in the horizontal direction can be obtained in a form of use in which the dome screen 101 is substantially horizontally provided as illustrated in FIG. 1 and FIG. 2, a viewing field in the vertical direction (specifically, below the horizon) is narrow. On the other hand, in a form of use in which the dome screen 101 is rotated around the horizontal axis as illustrated in FIG. 3, FIG. 4, FIG. 5 and FIG. 6, while the viewing field in the vertical direction expands, the viewing field in the horizontal direction becomes narrow. Therefore, the image display apparatus 100 includes an input device (none of them is illustrated) which enables operation of inputting a direction, such as a cursor key on a keyboard, an arrow key of a remote controller, and a joystick of a game controller to instruct the display control apparatus 105 to move the viewing field to be displayed on the dome screen 101 in the horizontal direction or in the vertical direction. The display control apparatus 105 cuts out a region to be displayed on the dome screen 101 from the original video with a wide viewing angle (such as the whole peripheral video) to move the region in accordance with the instruction of the direction input via the input device.

Figure 8A:
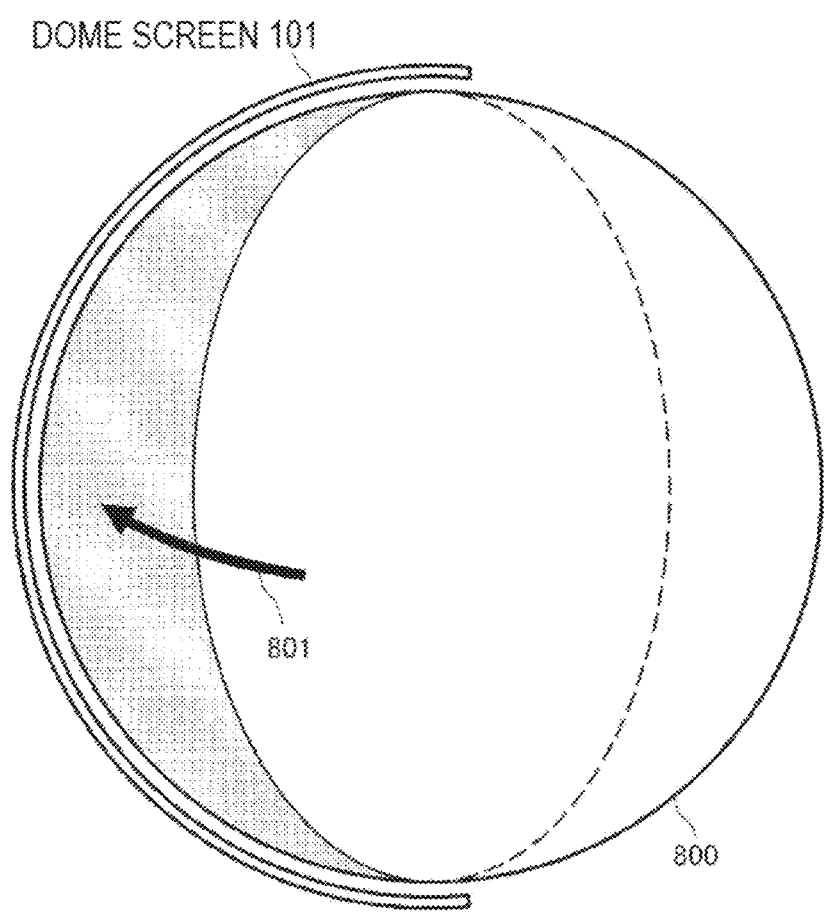
FIG. 8A is a diagram illustrating an aspect where a viewing field of a video to be projected on the dome screen 101 is moved in a horizontal direction.
Figure 8B:
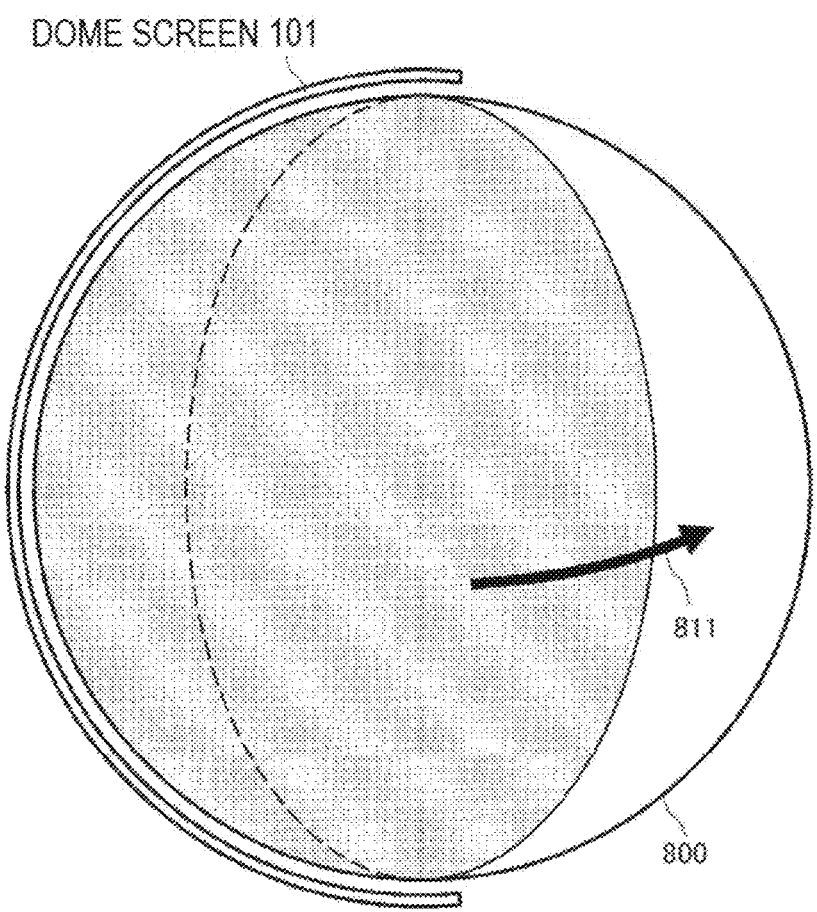
FIG. 8B is a diagram illustrating an aspect where a viewing field of a video to be projected on the dome screen 101 is moved in a horizontal direction.

FIG. 8A and FIG. 8B illustrate an aspect where the viewing field of the video to be projected on the dome screen 101 is moved in the horizontal direction in the form of use of the image display apparatus 100 illustrated in FIG. 3 and FIG. 4.

If an instruction of a left direction is given using a joystick, or the like, the viewing field of the video to be projected on the dome screen 101 among the original video with a wide viewing angle 800 moves in the left direction as indicated with a reference numeral 801 in FIG. 8A. Further, if an instruction of a right direction is given using a joystick, or the like, the viewing field of the video to be projected on the dome screen 101 is moved in the right direction as indicated with a reference numeral 811 in FIG. 8B. In this manner, it is possible to compensate for limitation of the viewing field in the horizontal direction when the dome screen 101 is rotated around the horizontal axis, with movement of a cut out region of the video.

Subsequently, additional components of the image display apparatus 100 will be described.

The image display apparatus 100 may further include a sound output apparatus (not illustrated) such as a speaker. A sound signal (for example, a sound signal collected at an imaging location) which synchronizes with a video to be displayed on the dome screen 101, sound guidance to the viewer sitting on the chair 106, or the like, is output from the sound output apparatus.

As the sound output apparatus, for example, a multichannel rear speaker may be provided. However, because there is a possibility that sound output from the speaker may converge at the center of the dome screen 101 and may become noise for the viewer, processing such as noise cancelling is required. Alternatively, as the sound output apparatus, earphones or a headphone may be used in place of the speaker.

Further, the image display apparatus 100 may include an input device (none of them is illustrated) such as a keyboard, a mouse, a game controller, and a joystick within the dome screen 101.

Further, the image display apparatus 100 may include a camera which images the inside of the dome screen 101. The camera is provided with the line of sight directed to a portion near the center of the dome screen 101 so as to be able to image, for example, the viewer sitting on the chair 106.

Figure 9:
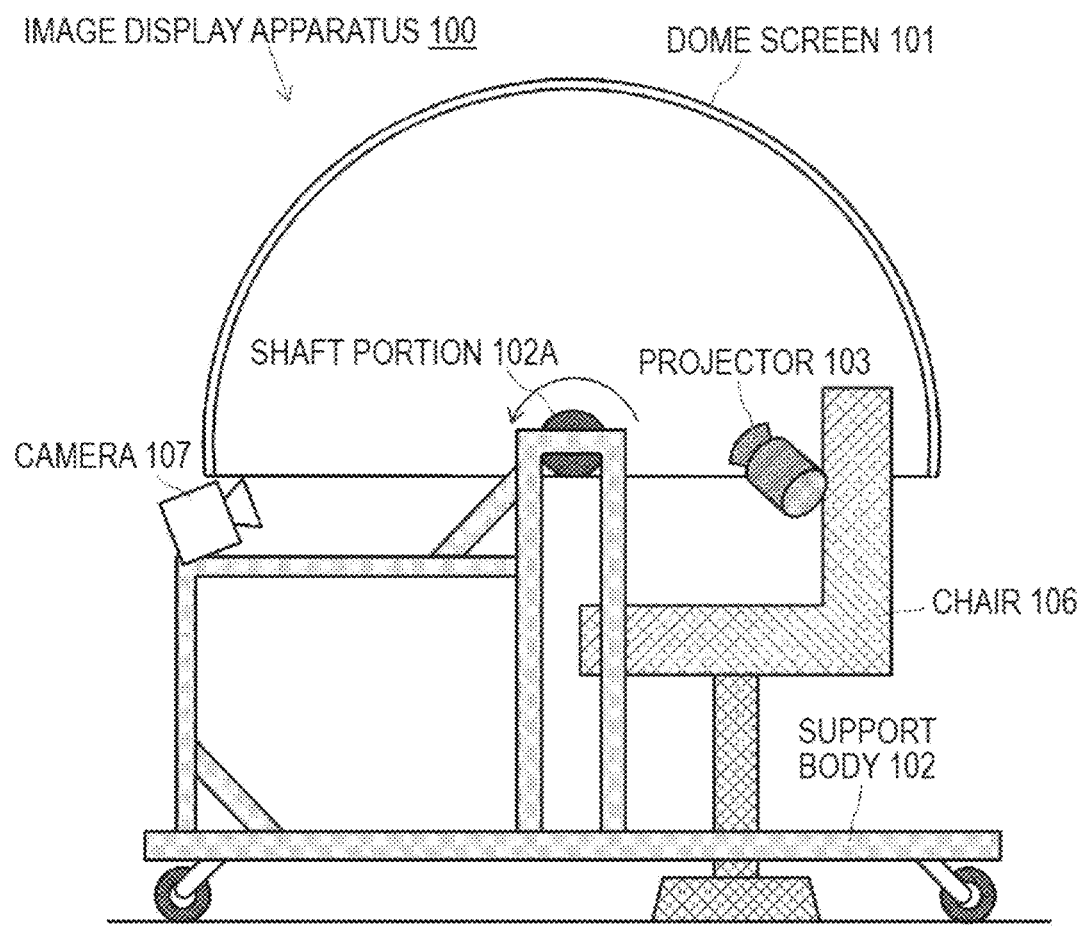
FIG. 9 is a diagram illustrating an aspect where a camera 107 is provided at the image display apparatus 100.

FIG. 9 illustrates an aspect where a camera 107 is provided at the image display apparatus 100. In the illustrated example, one camera 107 is provided in front of the chair 106 (viewer). However, the location where the camera 107 is provided is not limited to the front, and two or more cameras may be provided. Further, in the illustrated example, while the camera 107 is provided near the periphery of the dome screen 101, the type of the camera is not particularly limited. For example, it is also possible to make a pinhole on a surface of the dome screen 101 and image the inside of the dome with a pinhole camera (not illustrated) from the pinhole.

There are various kinds of application of an image captured with the camera 107. For example, it is possible to perform face recognition (personal authentication) or expression recognition of the viewer, analyze the image as to action of the arms and legs, the head and the body of the viewer to be utilized for gesture input, or utilize the image for a video for videoconference. Further, it is possible to capture operation by the viewer with respect to the GUI (described above) which is superimposed and displayed on the projected video from each of the projectors 103 and 104 with the camera 107.

Further, the image display apparatus 100 may include a sound input apparatus (not illustrated) such as a microphone which collects sound emitted by the viewer within the dome screen 101. The viewer can instruct the image display apparatus 100 with sound via the sound input apparatus. Further, it is also possible to make conversation (perform speech communication) with a person in a remote location by combining the sound input apparatus and the above-described sound output apparatus.

Figure 10:
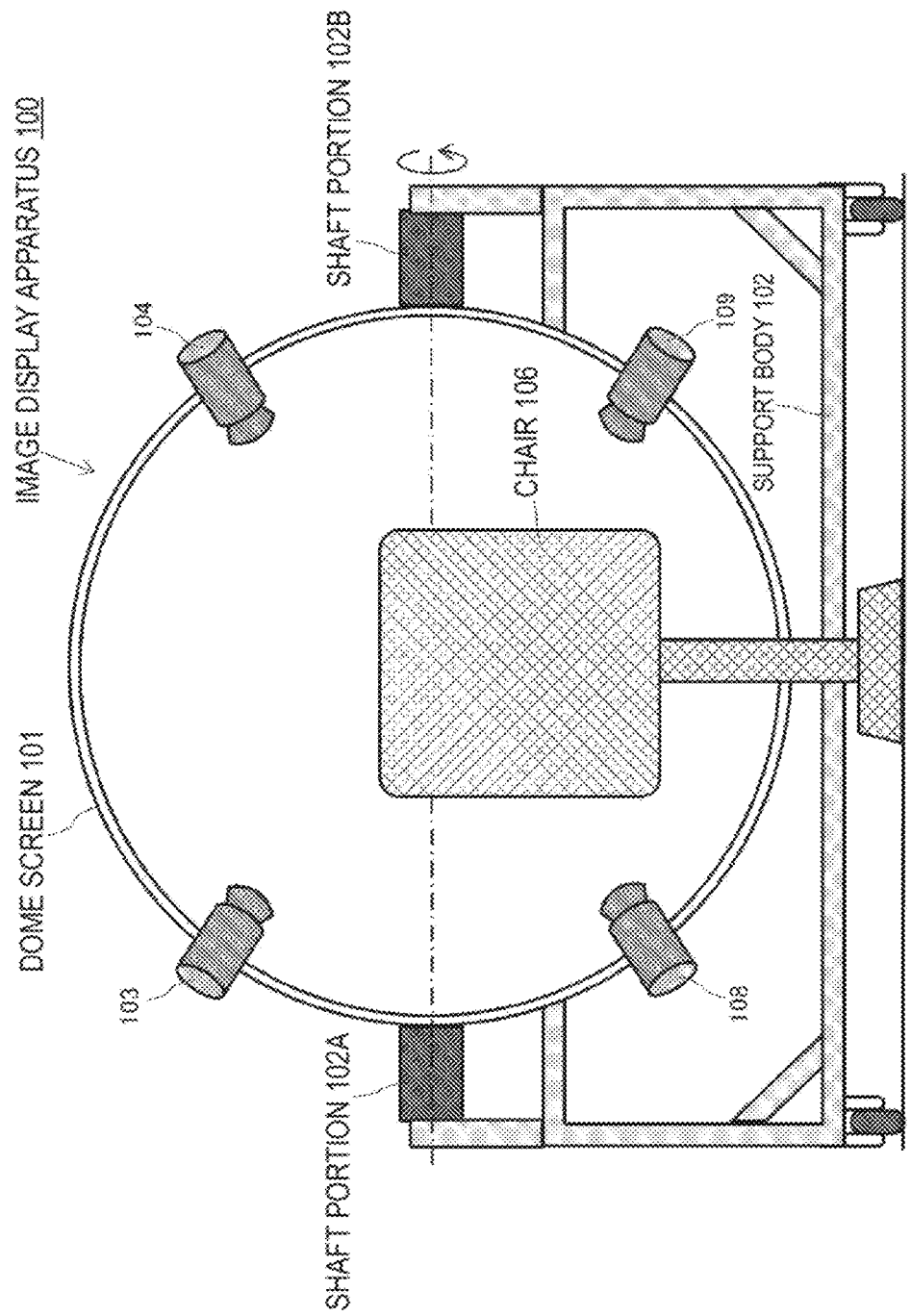
FIG. 10 is a diagram illustrating a configuration example of the image display apparatus 100 at which four projectors are provided.

Further, while, in the configuration example illustrated in FIG. 1, the image display apparatus 100 includes two projectors 103 and 104, three or more projectors may be provided. FIG. 10 illustrates an aspect where, in addition to the projectors 103 and 104, further tow projectors 108 and 109 are attached to the dome screen 101.

Figure 34:
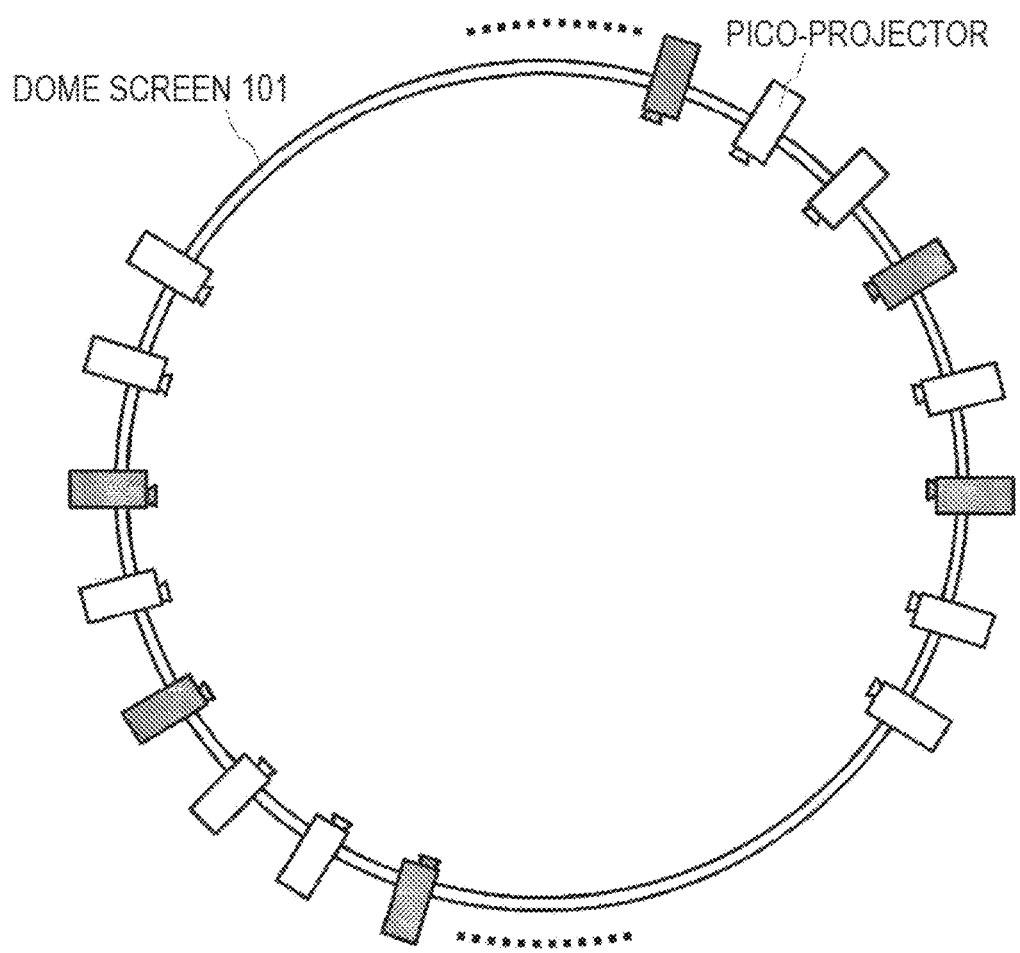
FIG. 34 is a diagram illustrating an aspect where a number of pico-projectors are provided at the dome screen 101.

As the projector which projects a video on the dome screen 101, for example, a palm-sized pico-projector with high resolution can be employed. With a pico-projector, because an area where the projector is provided is not required, it is possible to increase the number of projectors to be provided in the dome screen 101. FIG. 34 illustrates an aspect where a number of pico-projectors are provided at the dome screen 101. If the number of provided projectors increases, brightness, contrast and resolution of the projected video can be improved. Further, while there is a case where a video projected from one projector is blocked by the hand thrown out by the viewer and becomes shadow when the viewer within the dome screen 101 performs gesture action, or the like, it is possible to compensate for a portion of the shadow with a video projected from another projector. There is a problem that, if a number of projectors are turned on, power consumption increases. Therefore, it is also possible to make only a required number of projectors partially operate as appropriate instead of driving all the provided projectors at the same time. For example, the display control apparatus 105 only has to perform control so that the projectors are partly driven in accordance with attitude of the body, a position of the hand of the viewer, or the like. It is only necessary to provide a camera, a distance sensor, or the like, for each projector, detect whether there is an obstacle between each projector and the surface of the screen 101 or whether there is shadow in the projected video, and turn off a projector from which a video cannot be projected well, while turning on an adjacent projector instead. It is assumed that, in FIG. 34, pico-projectors indicated in white are being turned on, and pico-projectors indicated in gray are being turned off.

Figure 11:
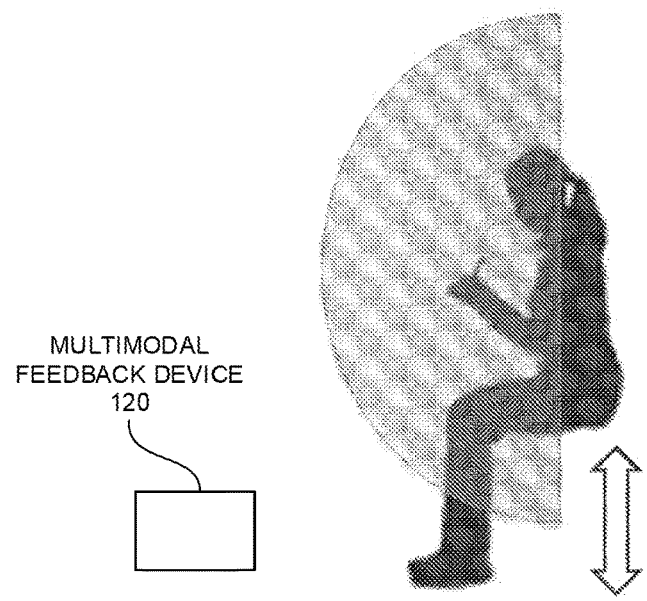
FIG. 11 is a diagram illustrating an aspect where a relative position of the dome screen 101 and a viewer is moved up and down.

Further, the image display apparatus 100 may include hydraulic driving means for moving the relative position of the dome screen 101 and the viewer sitting on the chair 106 up and down (see FIG. 11). Still further, the image display apparatus 100 may include a multimodal feedback device 120 for freely controlling an environment of space by adjusting a temperature and humidity within the dome screen 101, letting wind (breeze, opposing wind or air blast) blow to the viewer or spraying water (water blast), applying a sense of touch (such as an effect of poking the back and a sense of the back of the neck or the foot being touched by something) or vibration (such as shock from under the chair 106 and rumbling of the earth), or providing odor or aroma. For example, in the case where a video captured in a remote location is projected and displayed on the dome screen 101, it is possible to present feedback to reproduce sensation and experience received at the imaging location in space within the dome screen 101 using a multimodal feedback device 120 and enable a viewer to have experience with realistic sensation, which is real and similar to that at the imaging location.

Figure 19:
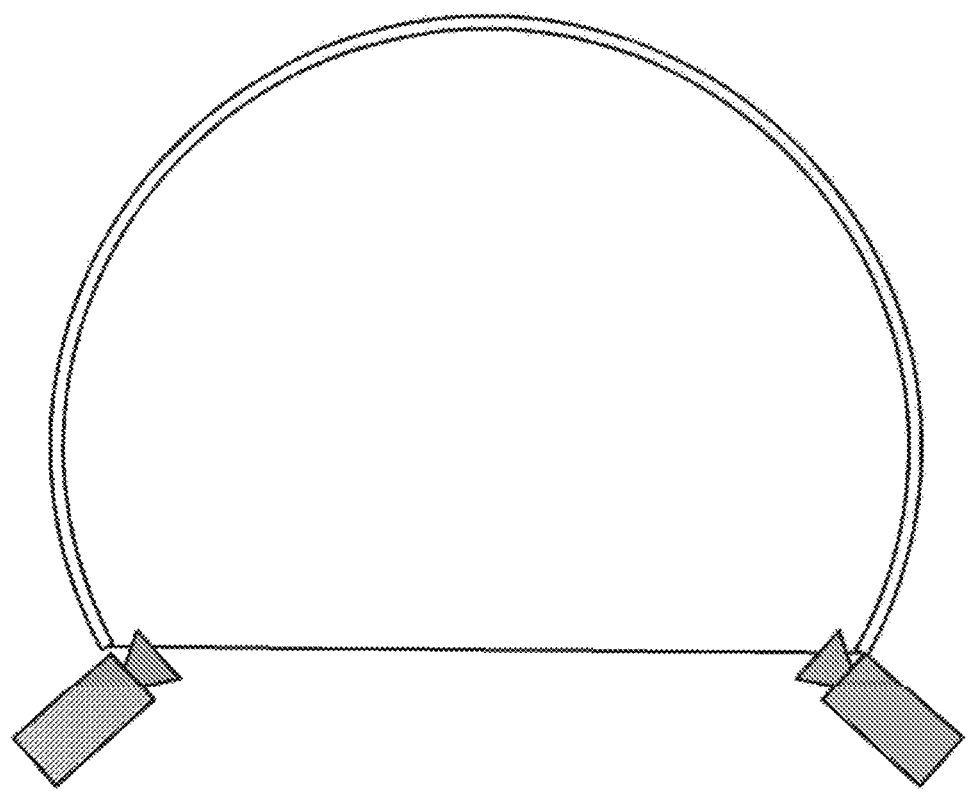
FIG. 19 is a diagram illustrating the dome screen 101 wider than 180 degrees.
Figure 20:
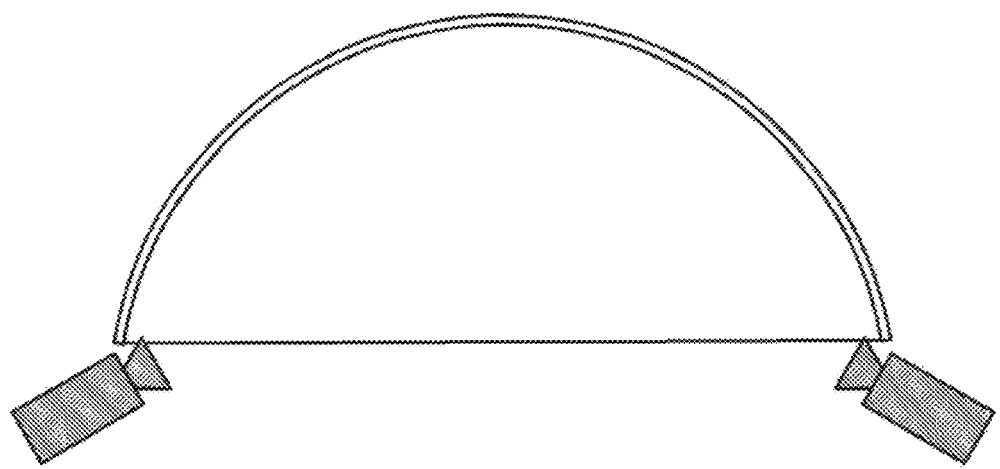
FIG. 20 is a diagram illustrating the dome screen 101 narrower than 180 degrees.

Note that, while FIG. 1, or the like, illustrates the dome screen 101 which is substantially 180 degrees, a dome which is wider than 180 degrees (see FIG. 19) or, inversely, a dome which is narrower than 180 degrees may be used as appropriate. By using a dome screen which is wider than 180 degrees (see FIG. 19), it is possible to project an image with a viewing field wider than 180 degrees in the vertical direction when the dome screen is substantially horizontally provided. Further, the shape of the projection plane of the inner wall surface of the dome screen 101 is not limited to a round (spherical shape), and may be an aspherical shape such as an elliptical shape, or may be a rectangular shape. It is assumed that the projection plane has an arbitrary shape in accordance with application, purpose, constraint of a location where the dome screen is provided, or the like. Even if the shape of the wall surface on which a video is to be projected by the projectors 103 and 104 is different, it is possible to display the same video by utilizing a projection mapping technique, or the like.

Figure 17:
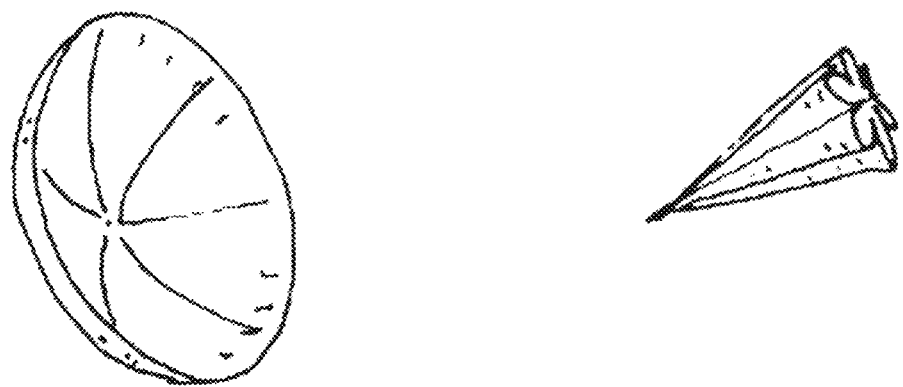
FIG. 17 is a diagram illustrating a configuration example of a folding dome screen.
Figure 18:
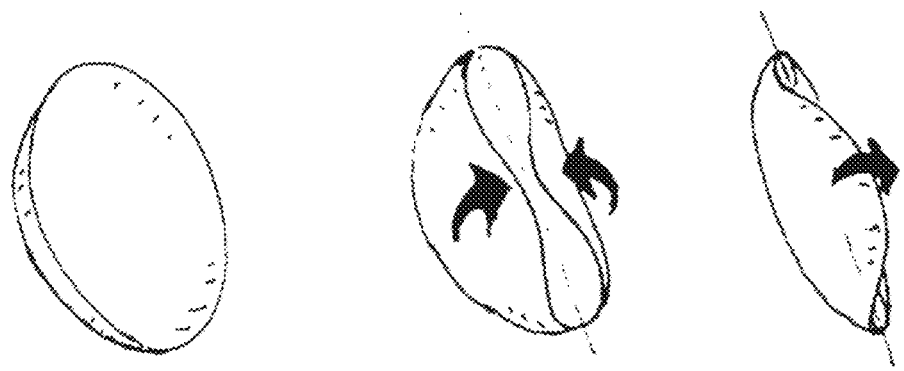
FIG. 18 is a diagram illustrating a configuration example of a soft-shell-type dome screen.

Further, while a rigid dome screen 101 configured with an FRP, a metal, glass, or the like, has been introduced above, it is also possible to employ a structure where the dome screen 101 can be folded and disassembled, so as to improve convenience in storage and portability. FIG. 17 illustrates a configuration example of a folding dome screen like an umbrella. Further, FIG. 18 illustrates a configuration example of a soft-shell type dome screen. The soft-shell type screen can be stored by being furled. If the dome screen 101 can be stored, the image display apparatus 100 easily becomes popular in standard home.

However, in a case of the folding dome screen, there is a problem that folding lines appear on the display surface of the inner periphery, and lines appear in a projected image. Further, it is concerned for both the folding and the soft-shell type dome screens that a crease or a flaw may be formed on the display surface of the inner periphery, which may cause distortion of a projected image and degradation in image quality. Therefore, it is preferable that the display surface of the inner periphery is configured with a material on which a crease or a flaw is less likely to be formed, such as urethane foam. Further, there is a problem of reproducibility upon assembly in the folding or the soft-shell type dome screen, and it is necessary to correct distortion of a video, which is caused because the dome screen cannot be assembled in the same shape.

Subsequently, a modified example of the form of use of the image display apparatus 100 will be described.

As already described above, if the inner diameter of the dome screen 101 is set at from approximately 1.5 to 2 meters, it is possible to present a projected video with a strong sense of reality. Meanwhile, if the dome screen 101 is made larger, it is possible to accommodate a plurality of viewers, and each viewer can work collaboratively while sharing an environment (a video with a wide viewing angle).

Figure 12:
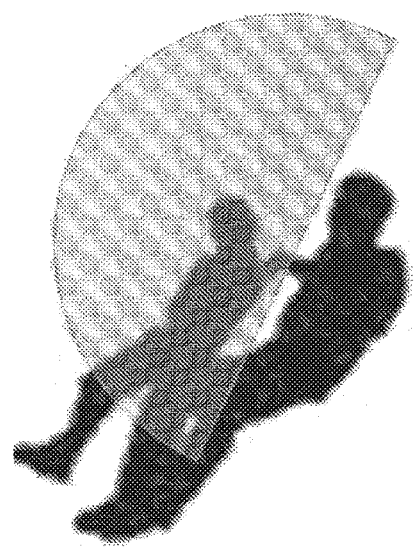
FIG. 12 is a diagram illustrating an aspect where two viewers sit side by side within the dome screen 101.

FIG. 12 illustrates an aspect where two viewers are sitting side by side within the dome screen 101. In such a form of use, the two viewers can work collaboratively while viewing substantially the same viewing field.

Figure 13:
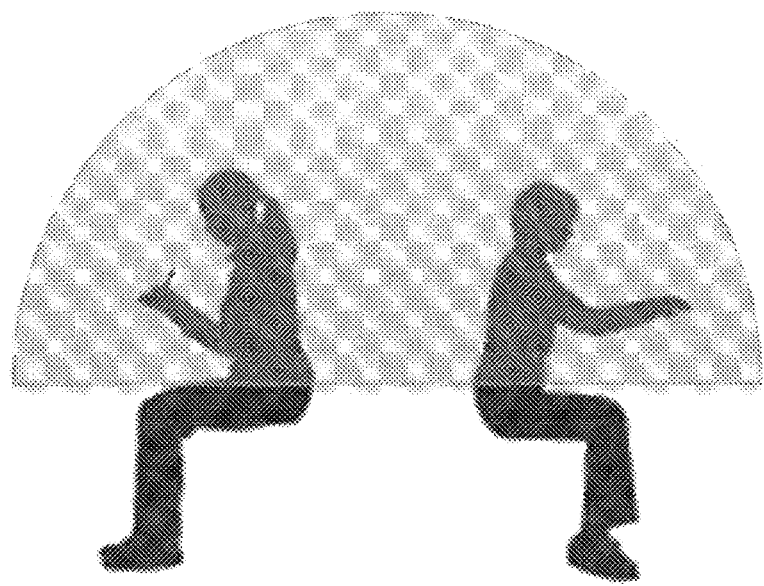
FIG. 13 is a diagram illustrating an aspect where two viewers are sitting with their backs against each other within the dome screen 101.

Further, FIG. 13 illustrates an aspect where two viewers are sitting with their backs against each other within the dome screen 101. In such a form of use, it is possible to observe a viewing field of 360 degrees in the horizontal direction with a plurality of persons. For example, in the case where large-sized machine including large transport machine such as a ship and an airliner is operated, because it is possible to overlook a viewing field of 360 degrees by sharing the viewing field with a plurality of persons, it becomes possible to perform visual observation in place of confirmation depending on a meter, or the like, as in related art, so that it is possible to reduce troubles and errors.

Figure 14:
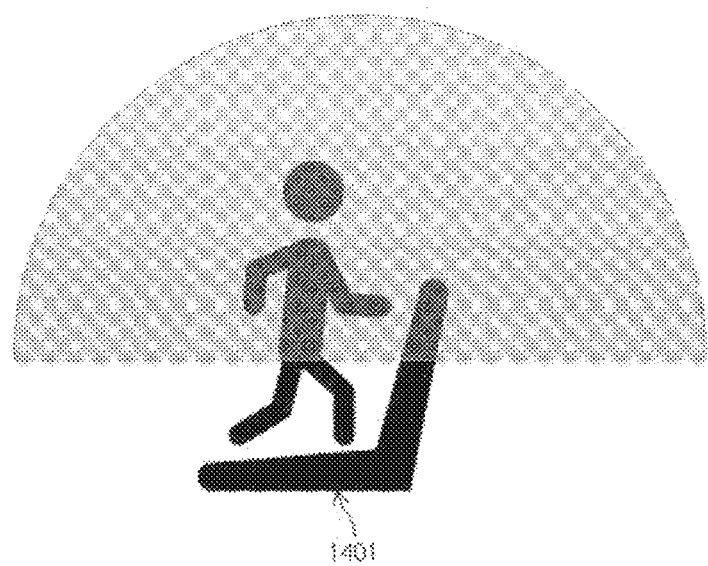
FIG. 14 is a diagram illustrating an aspect where a treadmill 1401 is provided within the dome screen 101.
Figure 15:
FIG. 15 is a diagram illustrating an aspect where an exercise bike 1501 is provided within the dome screen 101.

Further, it is also possible to provide health appliances such as a treadmill 1401 and an exercise bike 1501 in place of the chair 106 within the dome screen 101 (see FIG. 14 and FIG. 15). Because the viewer can watch a video with a wide viewing angle projected on the dome screen 101 while running on the treadmill or pedaling the exercise bike, it is possible to prevent the viewer from getting bored even with monotonic training. By the display control apparatus 105 moving a position of the viewpoint of the video with the wide viewing angle to be projected on the dome screen 101 in conjunction with a moving distance or moving speed of the treadmill 1401 or the exercise bike 1501, it is possible to increase a sense of reality.

Because the image display apparatus 100 of a type which projects a video on the dome screen 101 brings a sense of release and is less dangerous, it is possible to provide a sense of immersion to the viewer. Therefore, combination use with the health appliances as illustrated in FIG. 14 and FIG. 15 is fatigue friendly and is extremely beneficial. On the other hand, in the case where the HMD and the health appliances are used in combination, there is a problem that the viewer has to exercise while enduring the weight of the apparatus worn on the head, and because the viewer sweats from exercise, the apparatus gets dirty or being damaged by sweat.

Figure 22:
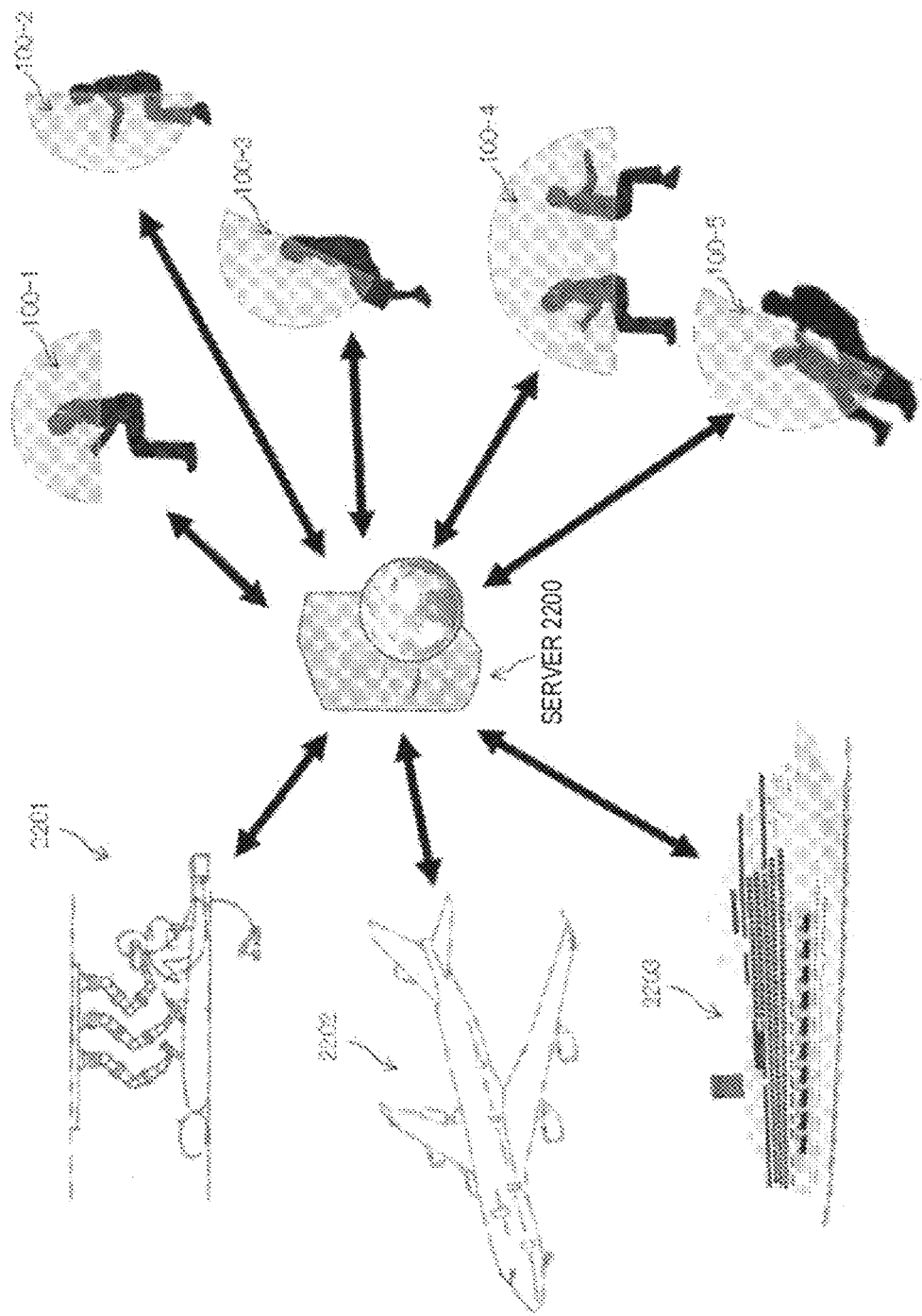
FIG. 22 is a diagram illustrating an application example of the image display apparatus 100.

FIG. 22 illustrates an application example of the image display apparatus 100 according to the present embodiment. FIG. 22 illustrates an example where a plurality of image display apparatuses 100-1, 100-2, . . . , 100-5 are applied to a video distribution system.

For example, an image captured with a camera provided within an operating room 2201 in which an operation is performed on a person or an animal using small-sized equipment such as a manipulator and an endoscope is transmitted to a predetermined server 2200. Further, a video with a wide viewing angle captured with large-sized machine such as large transport machine such as an airliner 2202 and a ferry 2203 is transmitted to the server 2200. Note that the video transmitted from the operating room 2201, the airliner 2202, the ferry 2203, or the like, may be a video captured with a see-through type HMD worn on the head of an operator (a doctor or a practitioner) of the small-sized equipment, an operator or a driver of the large-sized machine such as the airliner 2202 and the ferry 2203 as well as a video captured with a camera mounted within the operating room 2201 or on the small-sized equipment, a multi-view camera provided at large-sized machine such as the airliner 2202 and the ferry 2203, or the like. The video captured with the see-through type HMD is a video captured at substantially the same viewpoint as that of the wearer.

Meanwhile, at each of the image display apparatuses 100-1, 100-2, . . . , 100-5, it is possible to selectively view one of the videos via the server 2200. There are various forms of use of each of the image display apparatuses 100-1, 100-2, . . . , 100-5, including forms in which a video with a wide viewing angle is displayed while the dome screen 101 is tilted horizontally, vertically or at an arbitrary angle, or forms in which one viewer views a video, a plurality of viewers view a video side by side, or with their backs against each other.

Figure 35:
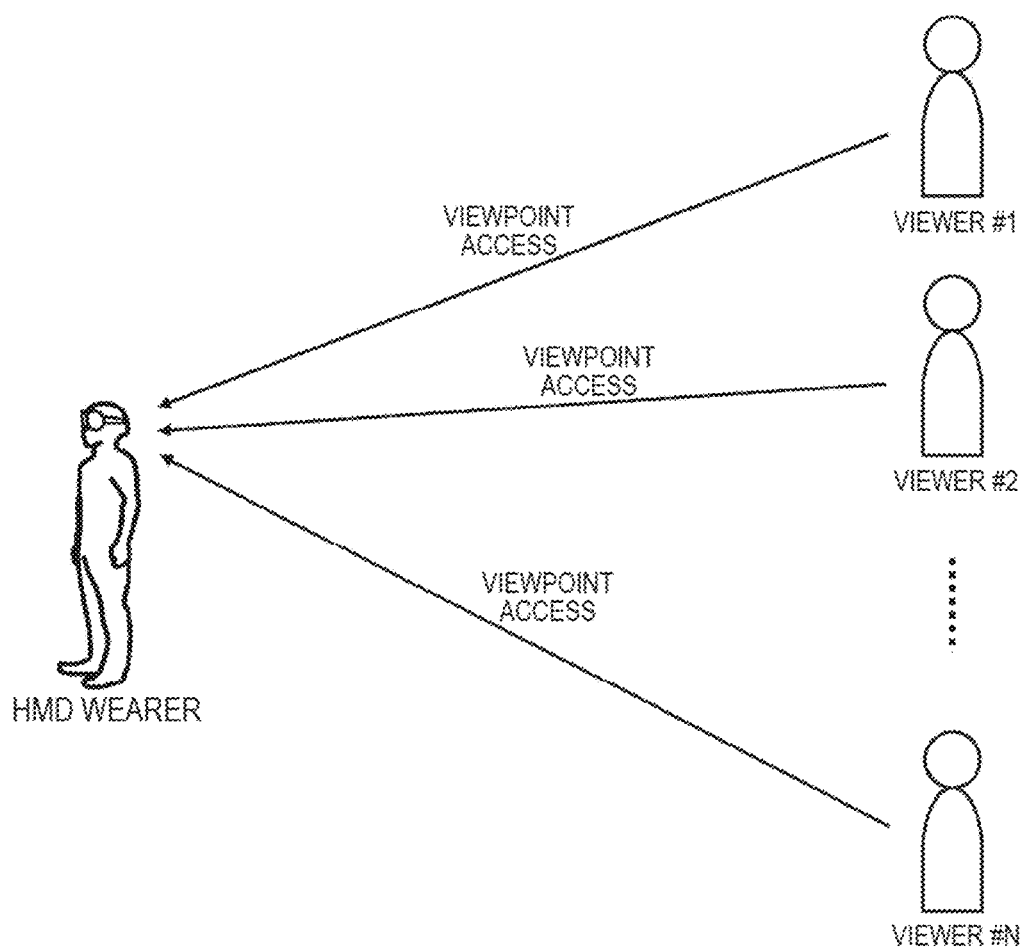
FIG. 35 is a diagram illustrating a form of sharing a viewpoint on a one-to-N basis in which a plurality of (N) viewers access a viewpoint of one HMD wearer at the same time.
Figure 36:
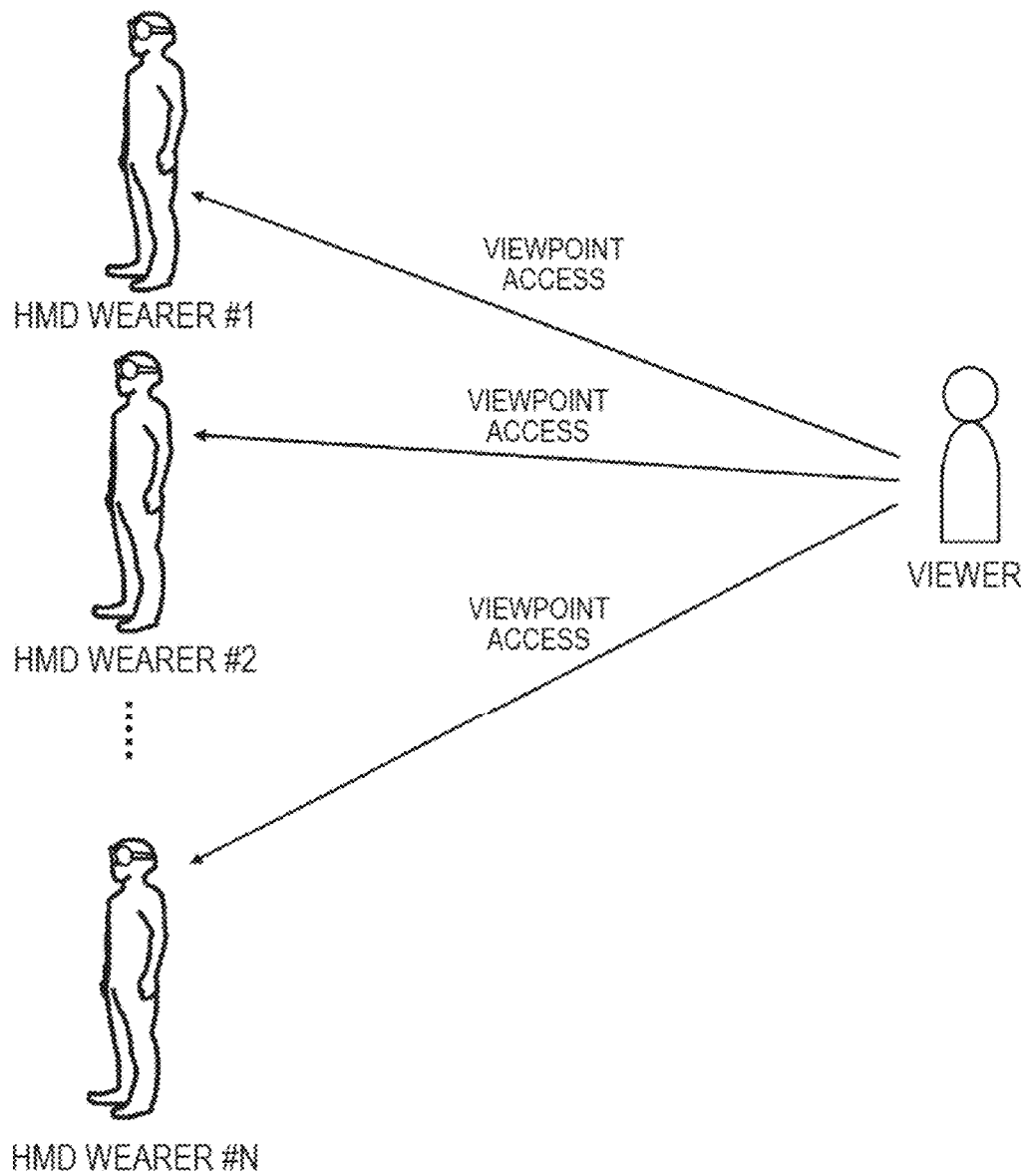
FIG. 36 is a diagram illustrating a form of sharing a viewpoint on an N-to-one basis in which one viewer selectively accesses one of viewpoints of a plurality of (N) HMD wearers.
Figure 37:
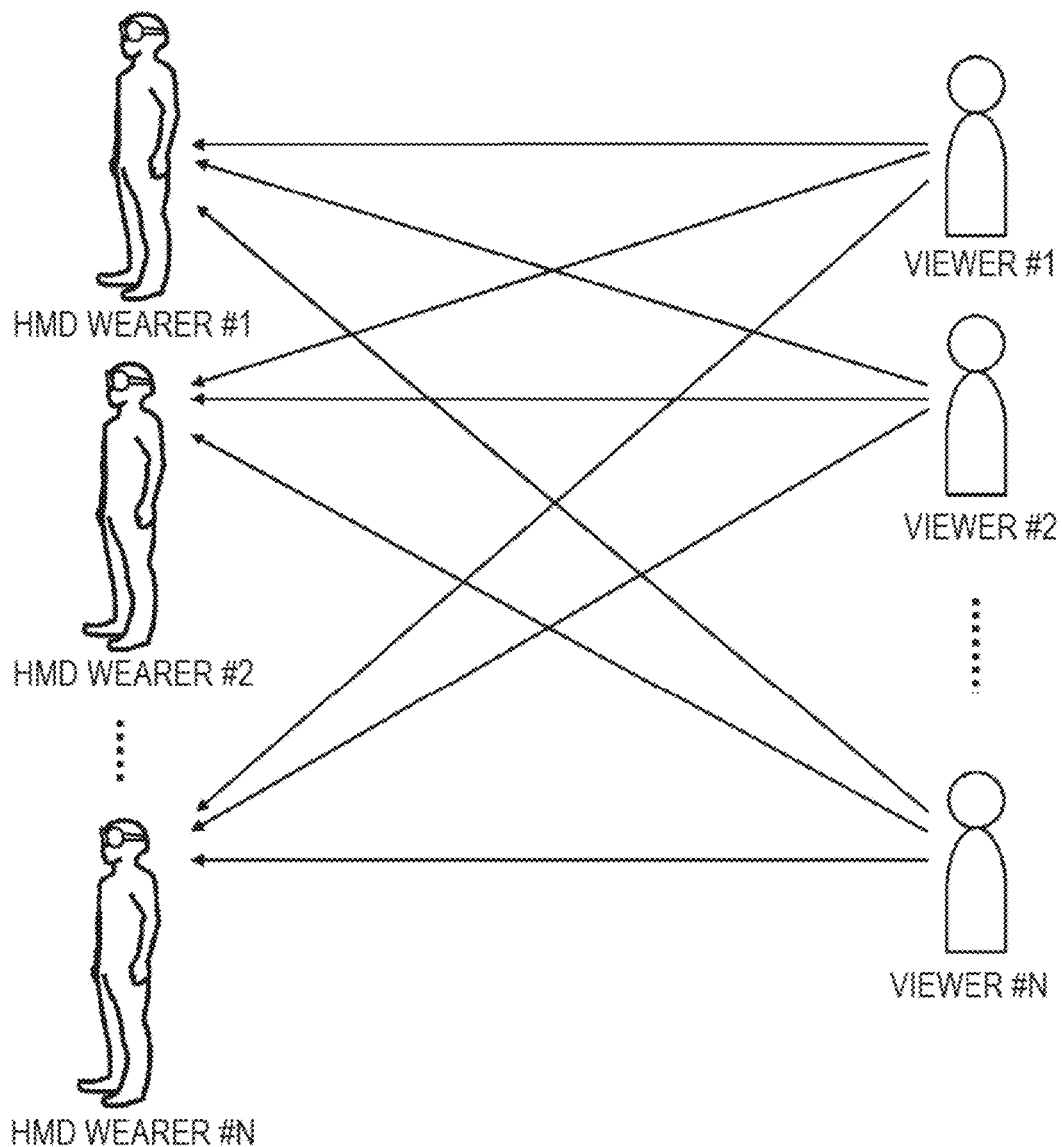
FIG. 37 is a diagram illustrating a form of sharing a viewpoint on an N-to-N basis in which each of a plurality of (N) viewers (including a case where a plurality of viewers enter one dome screen 101) selectively accesses one of viewpoints of a plurality of (N) HMD wearers.

In the case where the video captured with the see-through type HMD (described above) is displayed at each of the image display apparatuses 100-1, 100-2, . . . , 100-5, the viewer accesses substantially the same viewpoint as that of the wearer of the HMD and shares the viewpoint or a viewing field. For example, there can be a form of sharing a viewpoint on a one-to-N basis in which a plurality of (N) viewers access a viewpoint of one HMD wearer at the same time (including a case where a plurality of viewers enter one dome screen 101) as illustrated in FIG. 35, a form of sharing a viewpoint on an N-to-one basis in which one viewer selectively accesses one of viewpoints of a plurality of (N) HMD wearers as illustrated in FIG. 36, and a form of sharing a viewpoint on an N-to-N basis in which each of a plurality of (N) viewers (including a case where a plurality of viewers enter one dome screen 101) selectively accesses one of viewpoints of a plurality of (N) HMD wearers as illustrated in FIG. 37.

Further, information relating to an environment of a location where a viewing video is captured may be also transmitted to each of the image display apparatuses 100-1, 100-2, ..., 100-5 via the server 2200. At each of the image display apparatuses 100-1, 100-2, ..., 100-5, the multimodal feedback device 120 (described above, not shown in FIG. 22) may be driven on the basis of the received information of the environment to adjust the temperature and the humidity within the dome screen 101, let wind (breeze, opposing wind or air blast) blow to the viewer or spray water (water blast), apply a sense of touch (such as an effect of poking the back and a sense of the back of the neck or the foot being touched by something) or vibration (such as shock from under the chair 106 and rumbling of the earth), or provide odor or aroma. In the case where a video captured in a remote location is projected and displayed on the dome screen 101 as illustrated in FIG. 22, it is possible to present feedback to reproduce sensation and experience received at the imaging location in space within the dome screen 101 using the multimodal feedback device 120 and enable a viewer to have experience with realistic sensation, which is real and similar to that at the imaging location.

Further, at each of the image display apparatuses 100-1, 100-2, ..., 100-5, information such as gesture or sound input from the viewer, and expression obtained from a captured image of the viewer may be fed back to a source of the video. The feedback information from each of the image display apparatuses 100-1, 100-2, ..., 100-5 can be utilized as an instruction or advice for a practitioner of the operating room 2201, or an operator of large-sized machine such as the airliner 2201 and the ferry 2203.

Note that there is a possibility that the feedback information from the image display apparatus 100 may be not helpful for the practitioner of the operating room 2201, or the operator of the large-sized machine such as the airliner 2201 and the ferry 2203, and may be rather annoying and cause a mistake or an accident. Therefore, it is also possible to judge whether or not transmission of the feedback information is allowed on the basis of an authentication result, or the like, of the viewer of the image display apparatus 100.

Subsequently, a user interface of the image display apparatus 100 will be described.

As the user interface of the image display apparatus 100, an existing input device such as a keyboard, a mouse, a touch panel, a joystick and a controller for a game can be utilized. Further, sound input or gesture input can be used in place of the input device or in combination with the input device (described above).

It is important that the viewer can see his/her own hand in terms of reality. It is assumed that the input device as described above is held with the hand. In the case where a video with a wide viewing angle is viewed within the dome screen 101, the viewer can directly see his/her own hand. Meanwhile, while there is an HMD as a display apparatus with which a video with a wide viewing angle is viewed, because the HMD is worn on the head, which blocks a real viewing field, the viewer is unable to directly see his/her own hand.

Examples of interaction performed by the viewer of the video with a wide viewing angle can include movement of the position of the viewpoint. While the movement of the position of the viewpoint corresponds to, for example, switching of a camera position in a multi-view camera, the movement of the position of the viewpoint becomes interaction like spatial migration for the viewer. It is necessary to give an instruction of action such as, for example, walking around, running and momentarily moving (teleportation) to a location out of sight to perform spatial migration.

Normally, the hand of the viewer has a function of operating the input device or performing gesture input. Therefore, if the viewer tries to give an instruction of the spatial migration as described above with his/her hand, because it is necessary to switch functions of the hand, there is a problem that input work becomes discontinuous or is accompanied by unnaturalness.

Further, there can be a method in which an instruction of spatial migration is given by the viewer actually taking action such as walking around, running and moving. However, if the viewer walks around within the narrow dome screen 101, there is a risk that the viewer comes into contact or collides with equipment around the viewer.

Therefore, a user interface which enables the viewer to give an instruction of spatial migration while the viewer is sitting on the chair 106 will be described below.

This user interface detects a direction of the head (or a direction of line of sight) and slight up and down motion of the body of the viewer in a state where the viewer sits on the chair 106 and converts the direction of the head and the slight up and down motion of the body into action of instruction of spatial migration. The direction of the head and the up and down motion of the body can be detected by, for example, a position and attitude detecting unit being attached on the head of the viewer. The position and attitude detecting unit described here can be configured by combining a plurality of sensor elements such as, for example, a gyro sensor, an acceleration sensor and a geomagnetic sensor. As an example, it is also possible to construct a sensor which can detect a total of nine axes by combining three-axis gyro sensor, a three-axis acceleration sensor and a three-axis geomagnetic sensor, to be applied to the position and attitude detecting unit.

Further, it is also possible to analyze an image obtained by imaging the viewer with the camera 107 (described above) provided at the image display apparatus 100 and detect the direction of the head and the up and down motion of the body. Alternatively, it is possible to detect the direction of the head and the motion of the body of the viewer on the basis of change in the image captured with a camera (not illustrated) attached to the head of the viewer (for example, if the captured image is an image of a portion below the horizon, it can be understood that the viewer looks down, and, if the captured image is an image of a portion above the horizon, it can be understood that the viewer looks up. Further, if the captured image changes up and down, it can be understood that the viewer moves up and down.)

There is a large individual difference in motion imaged by a person. Even if a value of action data detected on the basis of an analysis result of an image captured with a sensor or a camera is the same, there is often the case where one person intends to take action of lifting his/her head up, while the other person does not intend to take such action. Further, there is similarly a large individual difference in action of directing his/her head up or down or slightly moving the body up and down while the person is sitting. Therefore, in order to realize a comfortable user interface, it is preferable to get a viewer who is a target to take action of lifting his/her head up, lifting his/her head down and slightly moving the body up and down while sitting a predetermined number of times and perform matching between intended action and action data, that is, perform machine learning in advance.

As a user interface which enables the viewer to give an instruction of spatial migration while the viewer is sitting on the chair 106, a walk UI, a run UI, a jump UI, and a micro-jump UI will be described below.

Figure 23:
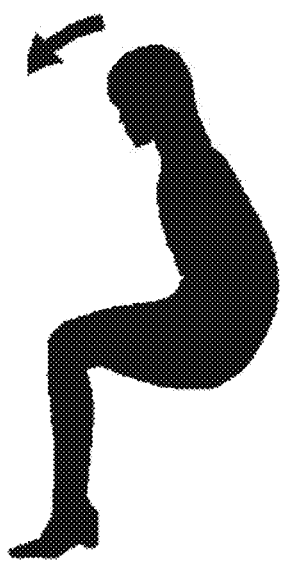
FIG. 23 is a diagram illustrating forward leaning action which gives an instruction to move forward in space while the viewer is sitting.
Figure 24:
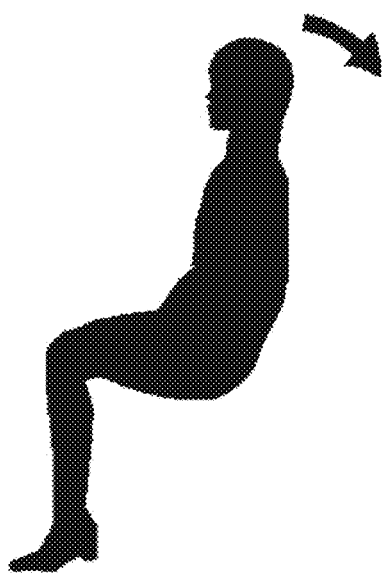
FIG. 24 is a diagram illustrating backward leaning action which gives an instruction to move backward in space while the viewer is sitting.

As illustrated in FIG. 23, if the viewer leans his/her body forward while sitting on the chair 106, it is an instruction of forward movement in space. Further, as illustrated in FIG. 24, if the viewer leans his/her body backward while sitting on the chair 106, it is an instruction of backward movement in space. This is a walk UI which gives an instruction of movement in a front-back direction. Further, it is possible to increase or decrease speed of moving in the front-back direction in accordance with an angle at which the viewer leans his/her body forward or backward. If the viewer shallowly leans his/her body, it becomes a walk UI, while the viewer deeply leans his/her body, it becomes a run UI.

Note that, while illustration is omitted, it is assumed that the viewer can give an instruction to move in a left anterior or a right anterior direction in space by leaning his/her body forward in one of left and right directions while sitting on the chair 106. In a similar manner, it is assumed that the viewer can give an instruction to move in a left rear or a right rear direction in space by leaning his/her body backward in one of left and right directions while sitting on the chair 106.

Typically, a person rarely looks up at the sky or looks down on the ground. The jump UI is a user interface which realizes comfortable movement to outside a visible range by utilizing the sky and the ground which a person rarely looks at.

Figure 25:
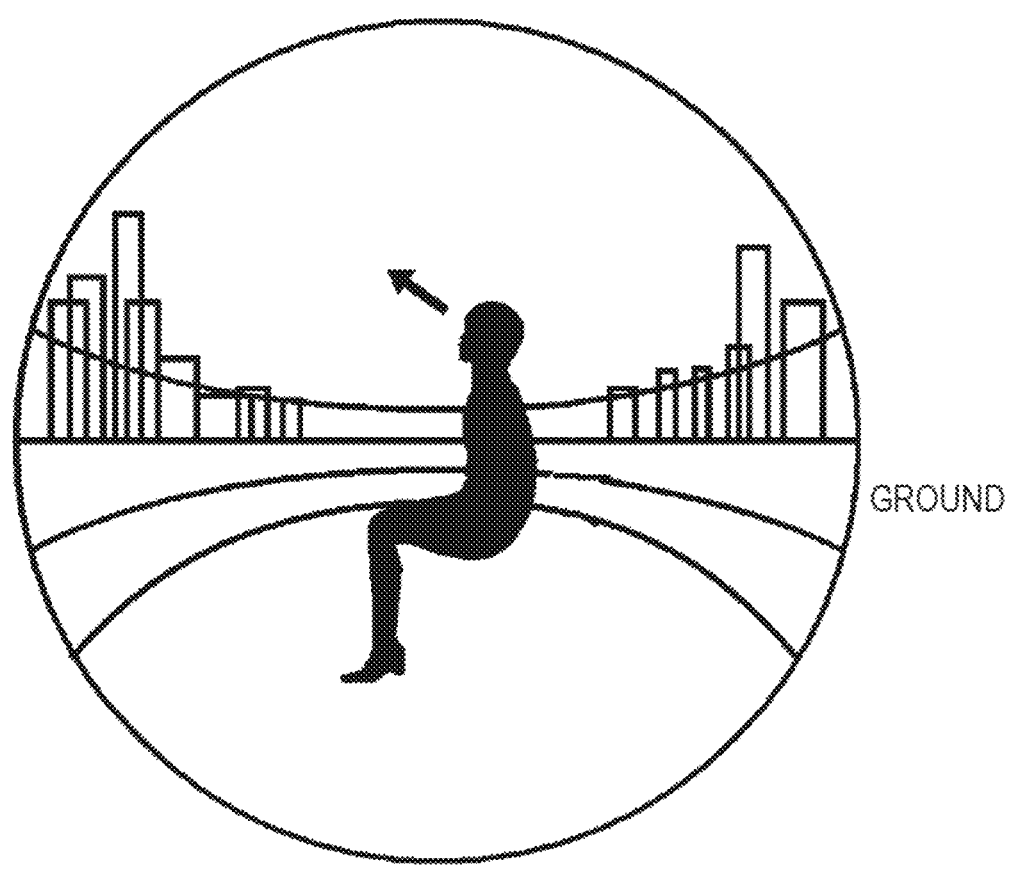
FIG. 25 is a diagram for explaining a jump UI.
Figure 26:
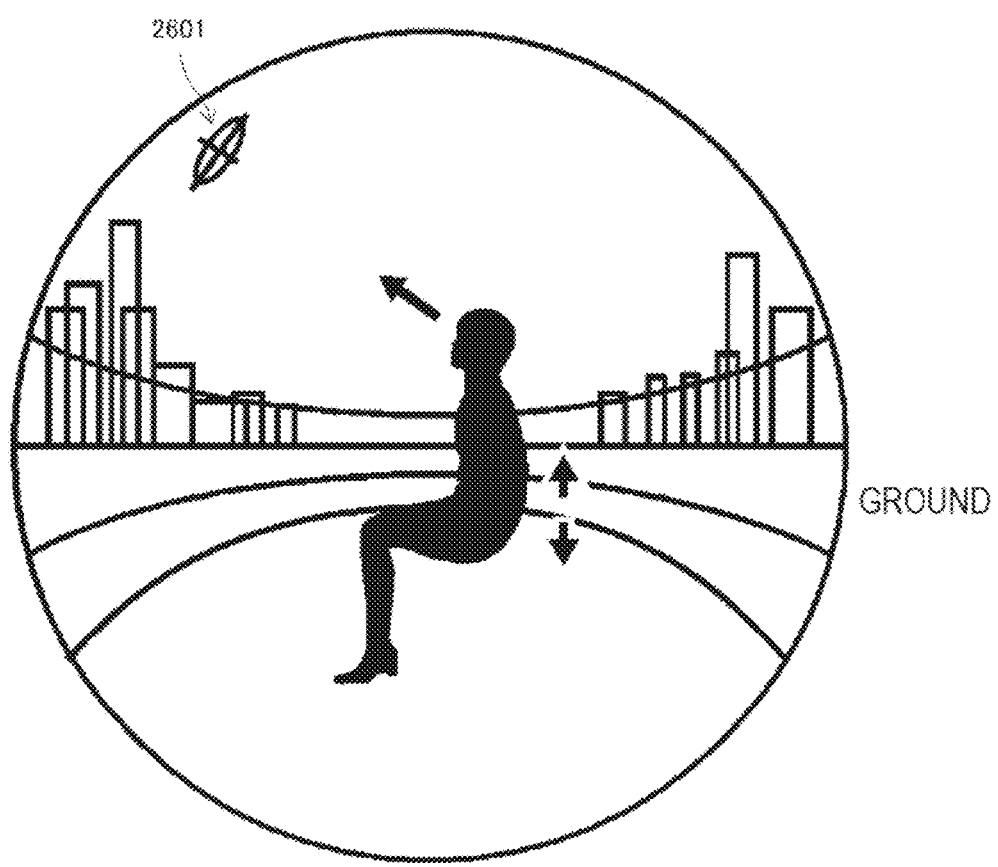
FIG. 26 is a diagram for explaining a jump UI.

As illustrated in FIG. 25, a viewer who has a view on the ground in space looks up and stares while sitting on the chair 106. Then, as illustrated in FIG. 26, a target mark 2601 appears in a direction of line of sight of the viewer in the sky in space. If the viewer further slightly moves his/her body up and down "jump action" in a state where the target mark 2601 is displayed in this manner, the video projected on the dome screen 101 is switched to a view from the sky. Note that, while illustration will be omitted, if the viewer repeatedly takes action of looking up the sky and performing jump action in a state where the target mark appears, it is possible to move to further up in the sky in space.

Figure 27:
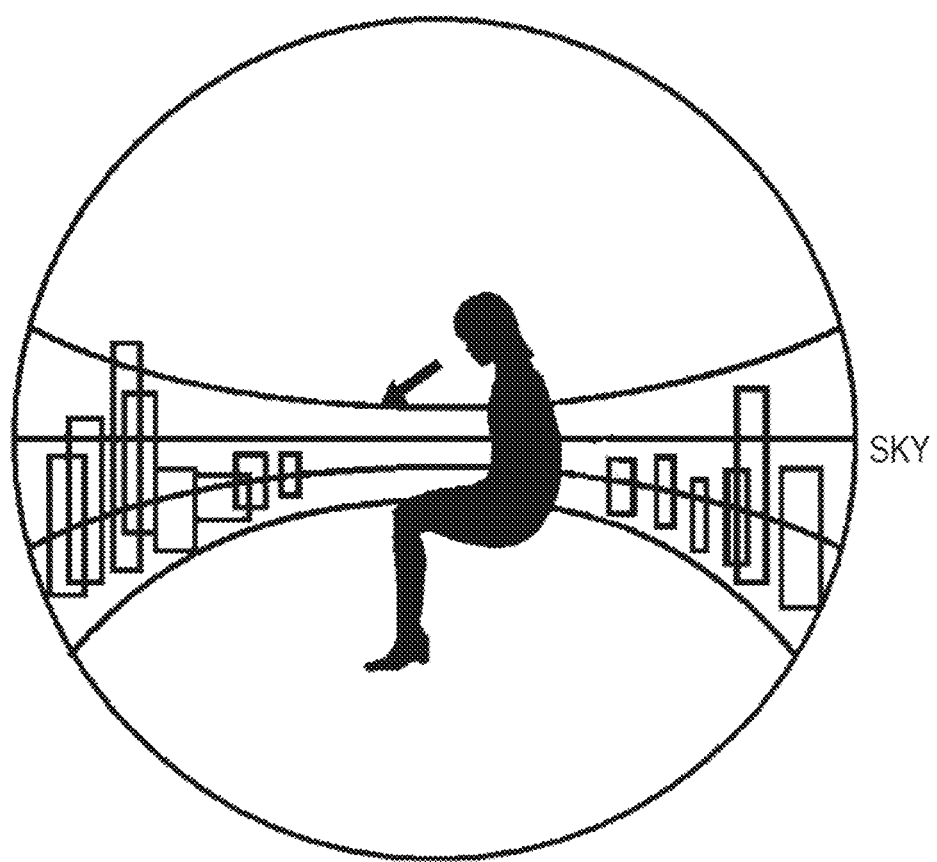
FIG. 27 is a diagram for explaining a jump UI.
Figure 28:
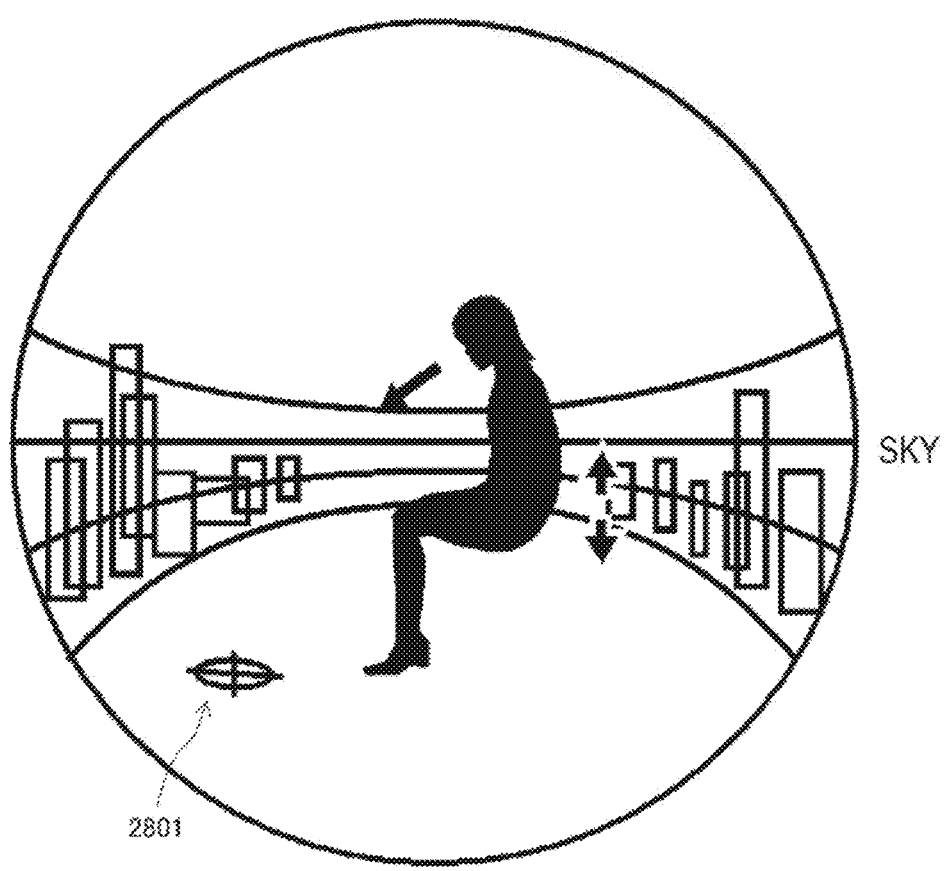
FIG. 28 is a diagram for explaining a jump UI.

Further, as illustrated in FIG. 27, a viewer who has a view of the sky in VR space looks down and stares while sitting on the chair 106. Then, as illustrated in FIG. 28, a target mark 2801 appears in a direction of line of sight on the ground in the VR space. If the viewer further slightly moves his/her body up and down "jump action" in a state where the target mark 2801 is displayed in this manner, the video is switched to a view on the ground dropped on a point where the target mark 2801 is displayed.

Figure 29:
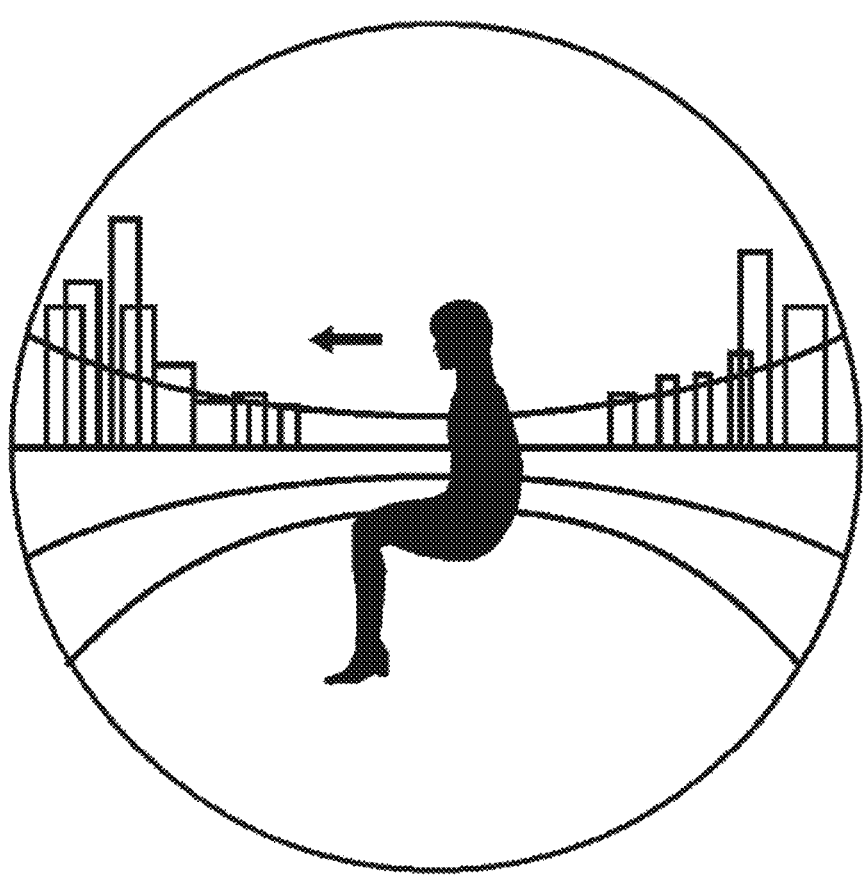
FIG. 29 is a diagram for explaining a micro jump UI.
Figure 30:
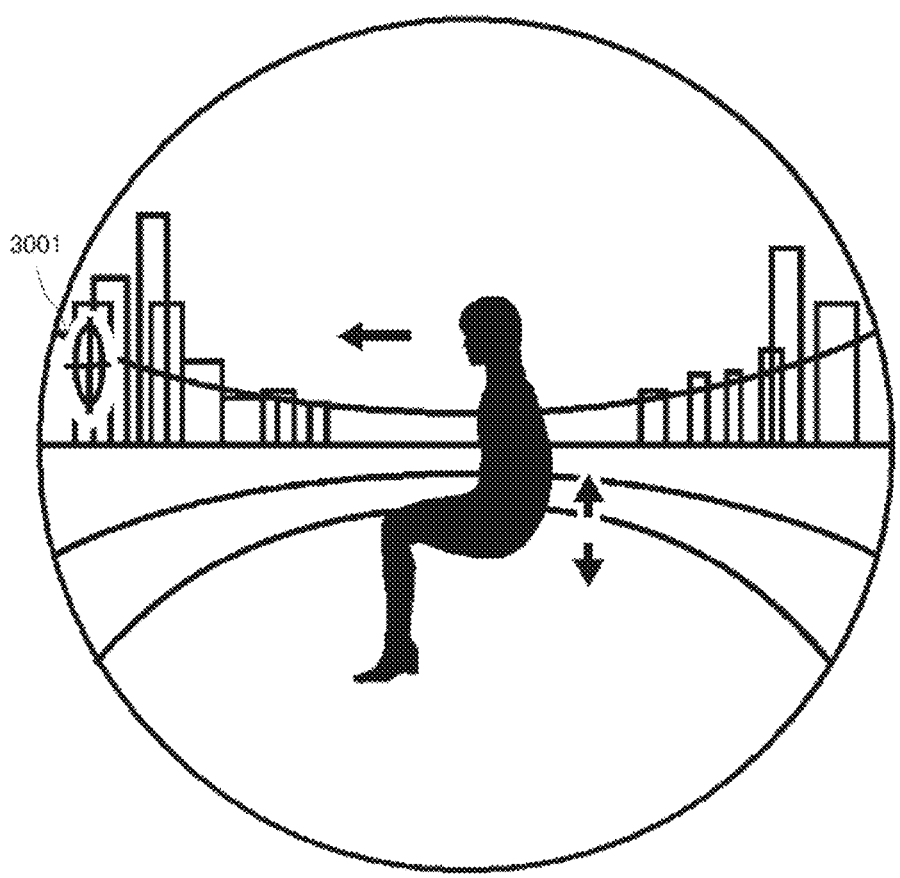
FIG. 30 is a diagram for explaining a micro jump UI.

Further, as illustrated in FIG. 29, a viewer who has a view on the ground (or the sky) faces front and stares while sitting on the chair 106. Then, as illustrated in FIG. 30, a target mark 3001 appears in front (ahead by a predetermined distance). If the viewer further slightly moves up and down his/her body "micro-jump action" in a state where the target mark 3001 is displayed in this manner, the video is switched to a view (illustration is omitted) jumped (momentarily moved) to a point where the target mark 3001 is displayed.

Figure 31:
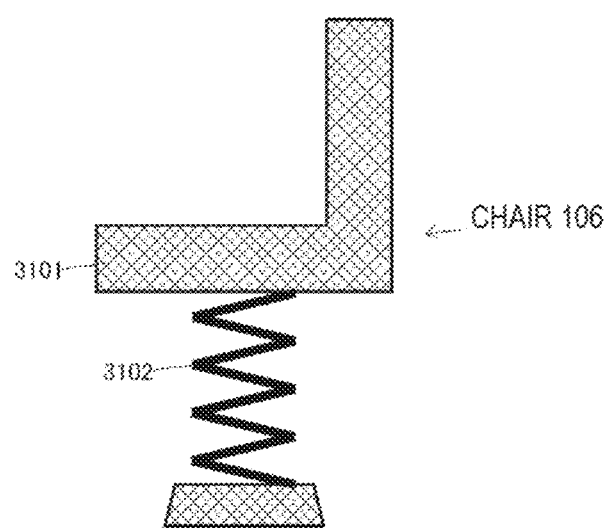
FIG. 31 is a diagram illustrating a configuration example of a chair 106.

In the above-described jump UI and micro-jump UI, the viewer has to take action of moving his/her body up and down while sitting on the chair 106. Therefore, as illustrated in FIG. 31, it is also possible to allow the viewer to easily move up and down his/her body using the chair 106 constructed such that a seating surface 3101 is supported with a spring 3102 which can expand and contract in an up-and-down (vertical) direction.

The target marks 2601, 2801 and 3001 respectively illustrated in FIG. 26, FIG. 28 and FIG. 30 have a role of specifying a location of the next position of the viewpoint on the video with a wide viewing angle which is being displayed on the dome screen 101. Note that it is also possible to display a target mark as a candidate for the next position of the viewpoint when a location where another multi-view camera is provided appears within the video with a wide viewing angle, as well as dispose a target mark at a location designated as the next position of the viewpoint by the viewer staring as described above.

Figure 32:
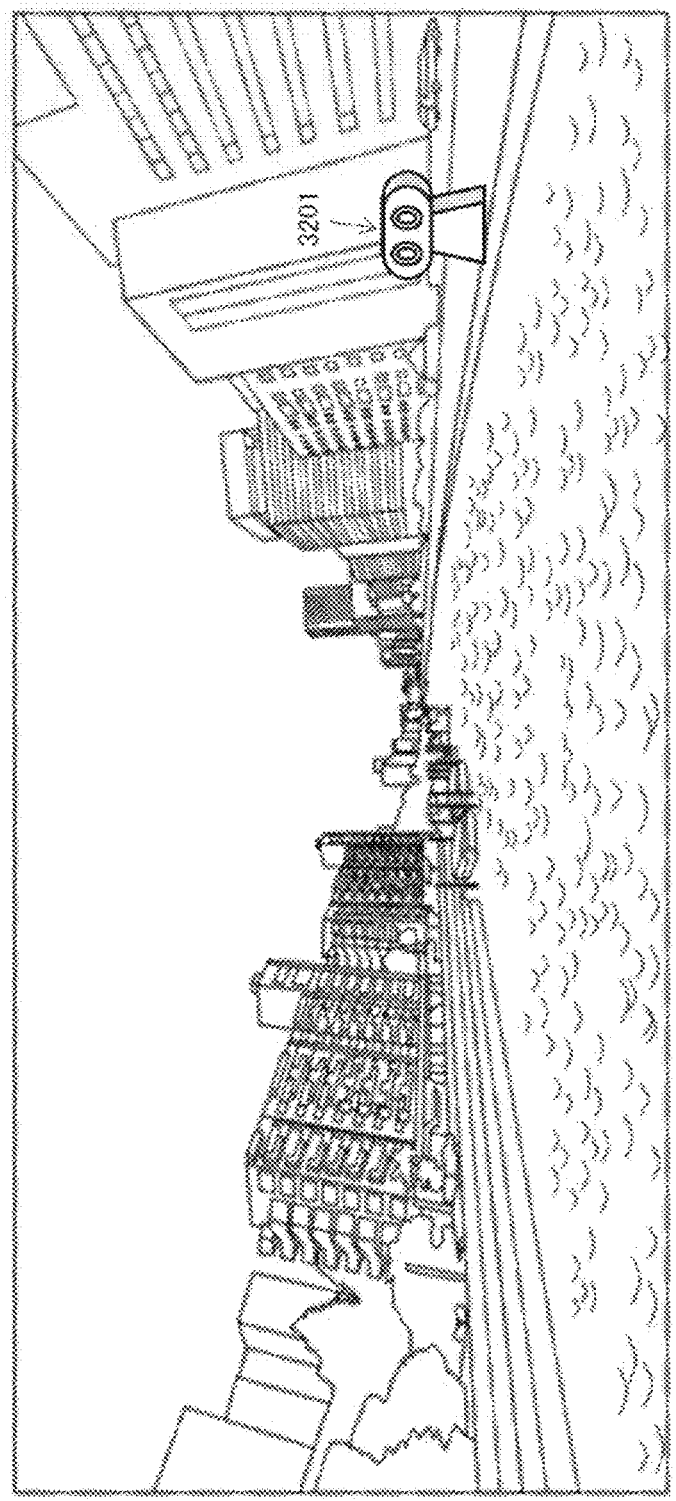
FIG. 32 is a diagram for explaining a display example of a target mark.
Figure 33:
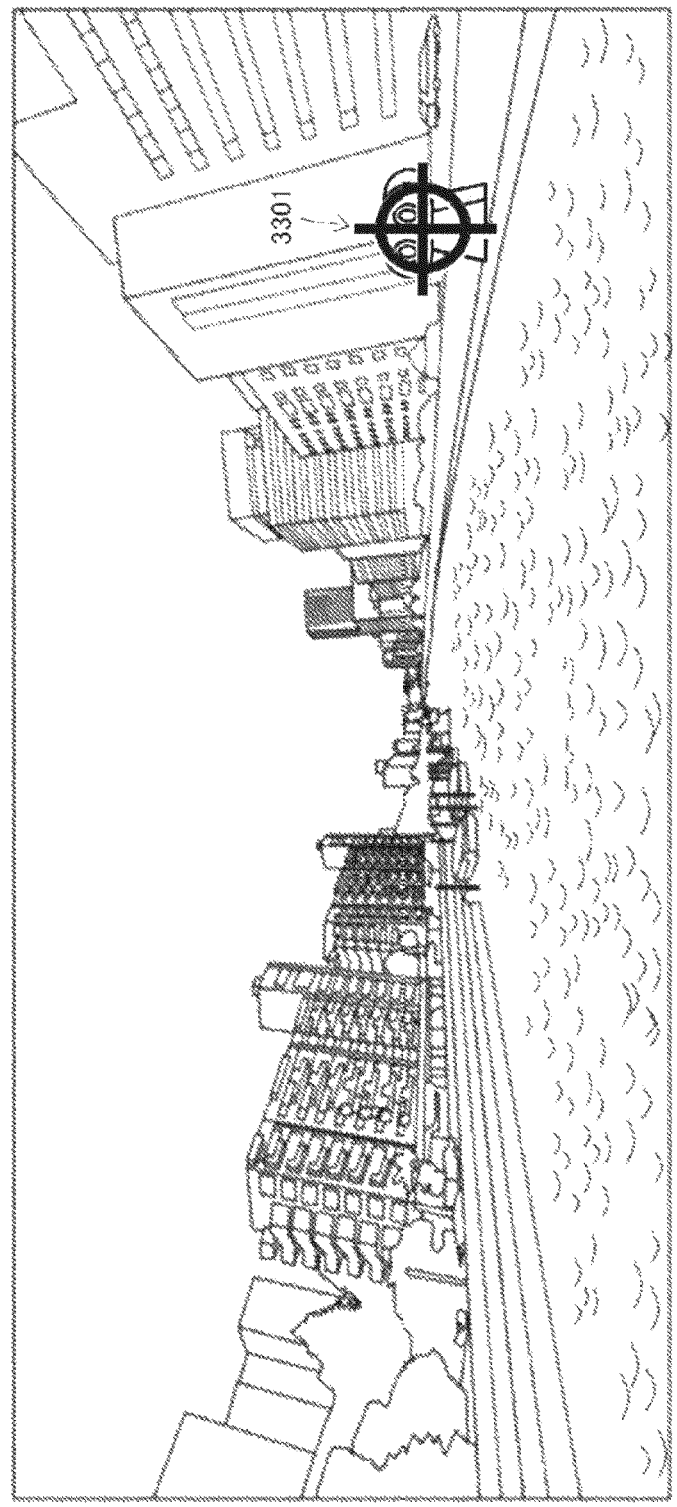
FIG. 33 is a diagram for explaining a display example of a target mark.

FIG. 32 illustrates an aspect where another camera 3201 which becomes a candidate for the next position of the viewpoint is found within the video with a wide viewing angle projected on the dome screen 101. If the display control apparatus 105 specifies a location where the camera 3201 is provided within the projected video on the basis of image analysis and the location information of the camera 3201, as illustrated in FIG. 33, the target mark 3301 is superimposed and displayed. Then, if the viewer stares at the target mark 3301 and slightly moves his/her body up and down while sitting on the chair 106, the position of the viewpoint moves to the location where the camera 3201 is provided, and the video is switched to a video in a direction of line of sight of the camera 3201 (illustration is omitted).

In the case where the jump UI as illustrated in FIG. 25 to FIG. 28 and the micro-jump UI as illustrated in FIG. 29 and FIG. 30 are performed, if a video to be projected on the dome screen 101 is instantaneously switched, there is concern of a problem of camera view loss such as the viewer being not able to recognize where on air the view is moved to (spatial loss), and the viewer being unable to recognize in which direction the view faces (directional loss).

Therefore, to prevent the camera view loss upon jump, the following measures may be taken. The following measures are easily realized within a dome which is separated from the outside world.

(1) Directional loss of the camera is prevented by letting wind (opposing wind) blow from a direction in which the viewer flies (for example, a point where a target mark appears).

(2) Directional loss of the camera is prevented by displaying an effect line such as a line for concentration from a direction in which the viewer flies (such as a point where a target mark appears) or adopting other cartoony expression on the projected video.

(3) Directional loss of the camera is prevented through a visual effect by letting fly an object such as a leaf of a tree and a piece of paper from a direction in which the viewer flies (for example, a point where a target mark appears).

(4) A feeling of strangeness is eliminated and directional loss of the camera is prevented by blurring (motion blur) the view when the camera view is switched in response to the jump UI.

(5) Spatial loss of the camera is prevented by reflecting shadow of the viewer on the ground when the viewer looks down from the sky (see, for example, FIG. 27).

Note that there is also an HMD as a display apparatus which enables viewing of a video with a wide viewing angle. Because the HMD is small and a location where the HMD is provided is not limited, the HMD can be utilized anywhere. On the other hand, there is a problem that because the head is tightened or the weight of the apparatus has to be supported with the neck when the viewer wears the HMD, the viewer gets tired if the HMD is used for a long period of time. Further, there is a problem that because the HMD is closely adhered to the skin of the viewer, the apparatus is damaged with sweating. Still further, there is also a problem that because the face and the viewing field of the viewer are covered if the viewer wears the HMD, the viewer has difficulty in using the HMD in combination with other input devices, the expression cannot be read, or there is a risk that the viewer stubs his/her arms or legs against an obstacle if the viewer moves.

Contrast to this, in a case of the image display apparatus 100 of a type which projects a video on the dome screen 101, because a sense of release is provided, the viewer is likely to be able to use the apparatus for a long period of time. Further, it is possible to observe the viewer inside the dome screen 101 with an image captured with a camera, or the like, so that it is possible to perform face recognition (personal authentication) and expression recognition. Still further, the viewer can use the apparatus in combination with other input devices inside the dome screen 101. Further, by a plurality of persons entering the dome screen 101 at the same time, it is possible to easily share the viewing video and realize collaborative work. Further, because working space is separated from the outside world by the dome screen 101, a multimodal interaction can be easily applied.

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification. Essentially, the technology disclosed in this specification has been described by way of example, and the stated content of this specification should not be interpreted as being limiting. The spirit of the technology disclosed in this specification should be determined in consideration of the claims.

Additionally, the technology disclosed in the present specification can also be configured as below.

(1)
An image display apparatus including:
a movable dome screen;
a support body configured to support the dome screen; and
a plurality of projectors whose relative positions with the dome screen and attitude are each fixed.

(2)
The image display apparatus according to (1),
in which the support body supports the dome screen so that the dome screen is rotatable around a predetermined horizontal axis, and
the plurality of projectors move in accordance with rotation of the dome screen around a horizontal axis.

(3)
The image display apparatus according to (1) or (2), further including: a display control apparatus configured to control a video to be projected on the dome screen from the plurality of projectors.

(4)
The image display apparatus according to (3),
in which the display control apparatus performs stitching processing on images to be projected on the dome screen by the plurality of projectors.

(5)
The image display apparatus according to any of (3) or (4),
in which the display control apparatus performs distortion correction processing on images to be projected on the dome screen by the plurality of projectors.

(6)
The image display apparatus according to any of (1) to (5),
in which the support body supports the dome screen with a pair of shaft portions so that the dome screen is rotatable around a predetermined horizontal axis by 90 degrees.

(7)
The image display apparatus according to (3),
in which the display control apparatus switches a viewing field of a video to be projected from the plurality of projectors in accordance with rotation of the dome screen around a horizontal axis.

(8)
The image display apparatus according to any of (1) to (7), further including:
an input unit configured to give an instruction to move a viewing field,
in which the display control unit switches a viewing field of a video to be projected from the plurality of projectors in accordance with the instruction to move the viewing field via the input unit.

(9)
The image display apparatus according to any of (1) to (8), further including:
a sound output apparatus.

(10)
The image display apparatus according to any of (1) to (9), further including:
a camera configured to image an inside of the dome screen.

(11)
The image display apparatus according to any of (1) to (10), further including:
a multimodal interface.

(12)
The image display apparatus according to (11),
in which the multimodal interface adjusts a temperature or humidity inside the dome screen, lets wind blow or sprays water inside the dome screen, causes a sense of touch or vibration or provides odor or aroma.

(13)
The image display apparatus according to any of (1) to (12),
in which the dome screen has a display surface whose inner diameter is from 1.5 to 2 meters as an inner periphery.

(14)
The image display apparatus according to any of (1) to (13),
in which the image display apparatus is used in combination with a chair stored within the dome screen.

(15)
The image display apparatus according to any of (1) to (13),
in which the image display apparatus is used in combination with a health appliance stored within the dome screen.

(16)

The image display apparatus according to (14), further including:

a video switching instructing unit through which a viewer gives an instruction to switch a viewing field to be projected on the dome screen while the viewer is sitting on the chair.

(17)

The image display apparatus according to (16), in which the video switching instructing unit detects a direction of a head and slight up and down motion of a body of the viewer who is sitting on the chair and converts the direction of the head and the slight up and down motion into action of a viewing field moving instruction.

(18)

The image display apparatus according to (16), in which a display control apparatus superimposes and displays a target mark on a video projected on the dome screen, the target mark indicating a candidate for a next position of a viewpoint.

(19)

The image display apparatus according to (14), in which a seating surface of the chair is supported with a spring which is expandable and contractible in a vertical direction.

REFERENCE SIGNS LIST 100 image display apparatus
101 dome screen
102 support body
102A, 102B shaft portion
103, 104 projector
105 display control apparatus
106 chair
107 camera
1401 treadmill
1501 exercise bike
2200 server
2201 operating room
2202 airliner
2203 ferry
3101 seating surface
3102 spring

The invention claimed is:

1. An image display apparatus comprising:
a movable dome screen;
a support body configured to support the dome screen; and
a plurality of projectors whose relative positions with the dome screen and attitude are each fixed,
wherein the support body supports the dome screen so that the dome screen is rotatable around a predetermined horizontal axis, and
the plurality of projectors move in accordance with rotation of the dome screen around a horizontal axis.

2. The image display apparatus according to claim 1, further comprising:
a display control apparatus configured to control a video to be projected on the dome screen from the plurality of projectors.

3. The image display apparatus according to claim 2, wherein the display control apparatus performs stitching processing on images to be projected on the dome screen by the plurality of projectors.

4. The image display apparatus according to claim 2, wherein the display control apparatus performs distortion correction processing on images to be projected on the dome screen by the plurality of projectors.

5. The image display apparatus according to claim 1, further comprising:
a sound output apparatus.

6. The image display apparatus according to claim 1, further comprising:
a camera configured to image an inside of the dome screen.

7. The image display apparatus according to claim 1, further comprising:
a multimodal feedback device.

8. The image display apparatus according to claim 1, wherein the image display apparatus is used in combination with a chair stored within the dome screen.

9. The image display apparatus according to claim 8, wherein a seating surface of the chair is supported with a spring which is expandable and contractible in a vertical direction.

10. An image display apparatus comprising:
a movable dome screen;
a support body configured to support the dome screen; and
a plurality of projectors whose relative positions with the dome screen and attitude are each fixed,
wherein the support body supports the dome screen with a pair of shaft portions so that the dome screen is rotatable around a predetermined horizontal axis by 90 degrees.

11. An image display apparatus comprising:
a movable dome screen;
a support body configured to support the dome screen;
a plurality of projectors whose relative positions with the dome screen and attitude are each fixed; and
a display control apparatus configured to control a video to be projected on the dome screen from the plurality of projectors,
wherein the display control apparatus switches a viewing field of a video to be projected from the plurality of projectors in accordance with rotation of the dome screen around a horizontal axis.

12. An image display apparatus comprising:
a movable dome screen;
a support body configured to support the dome screen;
a plurality of projectors whose relative positions with the dome screen and attitude are each fixed; and
an input unit configured to give an instruction to move a viewing field,
wherein the display control unit switches a viewing field of a video to be projected from the plurality of projectors in accordance with the instruction to move the viewing field via the input unit.

13. An image display apparatus comprising:
a movable dome screen;
a support body configured to support the dome screen;
a plurality of projectors whose relative positions with the dome screen and attitude are each fixed; and
a multimodal feedback device,
wherein the multimodal interface adjusts a temperature or humidity inside the dome screen, lets wind blow or sprays water inside the dome screen, causes a sense of touch or vibration or provides odor or aroma.

14. An image display apparatus comprising:
a movable dome screen;
a support body configured to support the dome screen; and
a plurality of projectors whose relative positions with the dome screen and attitude are each fixed,
wherein the dome screen has a display surface whose inner diameter is from 1.5 to 2 meters as an inner periphery.

15. An image display apparatus comprising:
a movable dome screen;
a support body configured to support the dome screen; and
a plurality of projectors whose relative positions with the dome screen and attitude are each fixed,
wherein the image display apparatus is used in combination with a health appliance stored within the dome screen.

16. An image display apparatus comprising:
a movable dome screen;
a support body configured to support the dome screen;
a plurality of projectors whose relative positions with the dome screen and attitude are each fixed;
a chair stored within the dome screen; and
a video switching instructing unit through which a viewer gives an instruction to switch a viewing field to be projected on the dome screen while the viewer is sitting on the chair.

17. The image display apparatus according to claim 16, wherein the video switching instructing unit detects a direction of a head and slight up and down motion of a body of the viewer who is sitting on the chair and converts the direction of the head and the slight up and down motion into action of a viewing field moving instruction.

18. The image display apparatus according to claim 16, wherein a display control apparatus superimposes and displays a target mark on a video projected on the dome screen, the target mark indicating a candidate for a next position of a viewpoint.

* * * * *